United States Patent
Steenbergen et al.

(10) Patent No.: US 10,156,092 B2
(45) Date of Patent: Dec. 18, 2018

(54) BLIND TILT ASSEMBLY AND METHOD OF CONTROLLING TILT LADDERS

(71) Applicant: Hunter Douglas Industries B.V., Rotterdam (NL)

(72) Inventors: Ralph Steenbergen, Stolwijk (NL); Nicolaas Dekker, Rhoon (NL); Wilfred Slobbe, Tilburg (NL)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

(21) Appl. No.: 15/270,236

(22) Filed: Sep. 20, 2016

(65) Prior Publication Data

US 2017/0009521 A1     Jan. 12, 2017

Related U.S. Application Data

(62) Division of application No. 14/380,613, filed as application No. PCT/EP2013/053950 on Feb. 27, 2013, now Pat. No. 9,487,996.

(30) Foreign Application Priority Data

Feb. 27, 2012   (EP) .................................. 12157142

(51) Int. Cl.
*E06B 9/322*     (2006.01)
*E06B 9/307*     (2006.01)
(Continued)

(52) U.S. Cl.
CPC .............. *E06B 9/307* (2013.01); *E06B 9/322* (2013.01); *F16H 21/44* (2013.01); *F16D 41/203* (2013.01); *Y10T 74/18888* (2015.01)

(58) Field of Classification Search
CPC ........... E06B 9/307; E06B 9/308; E06B 9/303
See application file for complete search history.

(56) References Cited

U.S. PATENT DOCUMENTS 1,365,919 A   1/1921   Jones
2,116,356 A   5/1938   Laborda et al.
(Continued)

FOREIGN PATENT DOCUMENTS

AU   410797 B2    2/1971
CA   2206932 A1   12/1997
(Continued)

OTHER PUBLICATIONS

PCT International Search Report dated Apr. 25, 2013 for International Application No. PCT/EP2013/053950, 3 pages.

*Primary Examiner* — Katherine W Mitchell
*Assistant Examiner* — Johnnie A. Shablack
(74) *Attorney, Agent, or Firm* — Dority & Manning, P.A.

(57) ABSTRACT

A tilt assembly for a blind including a first tilt ring and a second tilt ring, both rotatable about a drive axis for supporting a pair of tilt ladders, an input connector rotatable about the drive axis and configured to receive a drive shaft for rotating a lift spool and the input connector, a secondary input mechanism rotatable about the drive axis and configured to receive the drive shaft for rotating the secondary input mechanism with the input connector, a main clutch mechanism for releasably connecting the first tilt ring to the input connector and configured to release connection at each of two opposite rotational orientations of the first tilt ring, and a secondary clutch mechanism for releasably connecting the second tilt ring to the secondary input mechanism and configured to release connection at each of two opposite rotational orientations of the second tilt ring.

21 Claims, 18 Drawing Sheets

(51) Int. Cl.
*F16H 21/44* (2006.01)
*F16D 41/20* (2006.01)

(56) References Cited

U.S. PATENT DOCUMENTS

| | | | |
|---|---|---|---|
| 2,117,953 A | 5/1938 | Grau | |
| 2,250,106 A | 7/1941 | Lorentzen | |
| 2,427,266 A | 9/1947 | Ewing | |
| 2,506,507 A | 5/1950 | Kiatta | |
| 2,673,607 A | 3/1954 | Rulfs | |
| 2,719,586 A | 10/1955 | Graham | |
| 2,723,716 A | 11/1955 | Berni | |
| 2,747,662 A | 5/1956 | Reiners et al. | |
| 2,751,000 A | 6/1956 | Mahan | |
| 3,111,164 A | 11/1963 | Lombard | |
| 3,633,646 A | 1/1972 | Zilver | |
| 3,918,513 A | 11/1975 | Englund et al. | |
| 4,143,699 A | 3/1979 | Marotto | |
| 4,557,159 A | 12/1985 | Gross | |
| 4,572,267 A | 2/1986 | Stein et al. | |
| 4,593,738 A | 6/1986 | Chi Yu | |
| 4,621,672 A | 11/1986 | Hsu | |
| 4,628,979 A | 12/1986 | Hsu | |
| 4,697,629 A | 10/1987 | Anderson | |
| 4,708,188 A | 11/1987 | Bytheway, Jr. | |
| 4,869,308 A | 9/1989 | Chang | |
| 4,921,032 A | 5/1990 | May | |
| 4,940,070 A | 7/1990 | Warden | |
| 5,119,868 A * | 6/1992 | Werner | E06B 9/307 160/115 |
| 5,205,335 A | 4/1993 | Horton et al. | |
| 5,232,037 A | 8/1993 | Fraser | |
| 5,309,974 A | 5/1994 | Fraser | |
| 5,402,840 A | 4/1995 | Jortner et al. | |
| 5,472,035 A | 12/1995 | Biba et al. | |
| 5,485,874 A | 1/1996 | Whitmore | |
| 5,628,356 A | 5/1997 | Marocco | |
| 5,638,882 A | 6/1997 | Morris | |
| 5,901,767 A | 5/1999 | Ralton et al. | |
| 5,934,350 A | 8/1999 | Ciuca | |
| 6,076,587 A * | 6/2000 | Pastor | E06B 9/307 160/115 |
| 6,105,652 A | 8/2000 | Judkins | |
| 6,318,439 B1 | 11/2001 | Matsubara | |
| 6,422,288 B1 | 7/2002 | Dekker et al. | |
| 6,561,252 B2 | 5/2003 | Anderson et al. | |
| 6,581,665 B2 | 6/2003 | Lin | |
| 6,644,377 B1 | 11/2003 | Lewis | |
| 6,648,048 B2 | 11/2003 | Lai | |
| 6,845,802 B1 | 1/2005 | Anderson et al. | |
| 7,159,636 B2 | 1/2007 | Liang | |
| 7,424,905 B2 | 9/2008 | Lai | |
| 7,913,738 B2 | 3/2011 | Fraser et al. | |
| 8,267,145 B2 | 9/2012 | Fraser et al. | |
| 8,281,843 B2 | 10/2012 | Yu et al. | |
| 8,485,242 B2 | 7/2013 | Fraser et al. | |
| 9,487,996 B2 | 11/2016 | Steenbergen et al. | |
| 2001/0052397 A1 | 12/2001 | Matsubara | |
| 2003/0127197 A1 | 7/2003 | Lai | |
| 2005/0274465 A1 | 12/2005 | Hsu | |
| 2006/0169420 A1 | 8/2006 | Linag | |
| 2007/0261797 A1 | 11/2007 | Fraser et al. | |
| 2010/0065226 A1 * | 3/2010 | Fraser | E06B 9/307 160/168.1 R |
| 2015/0033910 A1 | 2/2015 | Steenbergen et al. | |

FOREIGN PATENT DOCUMENTS

| | | |
|---|---|---|
| DE | 134151 | 8/1901 |
| DE | 3022314 A1 | 12/1981 |
| DE | 20115547 U1 | 3/2002 |
| EP | 356590 A1 | 3/1990 |
| EP | 0609541 A1 | 8/1994 |
| EP | 0620355 A1 | 10/1994 |
| EP | 0887507 A2 | 12/1998 |
| EP | 1052365 A2 * | 11/2000 |
| GB | 1093756 | 12/1967 |
| GB | 2158137 A | 11/1985 |
| JP | 6355595 | 11/1988 |
| JP | 8210060 | 8/1996 |
| JP | 9021282 | 1/1997 |
| JP | 11270253 | 10/1999 |
| JP | 2006016804 A | 1/2006 |
| WO | 98/27307 A1 | 6/1998 |
| WO | 2008/150789 A1 | 12/2008 |

* cited by examiner

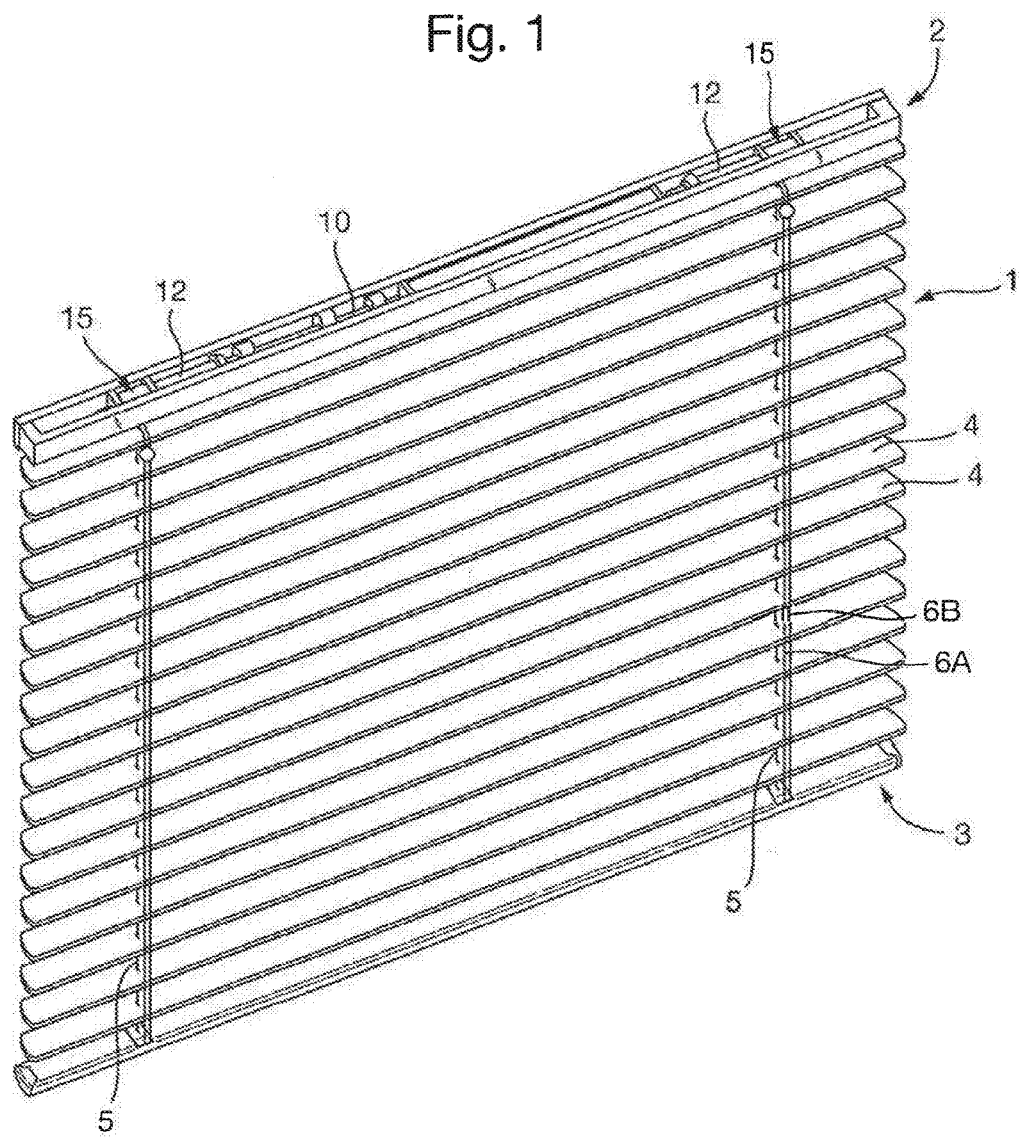

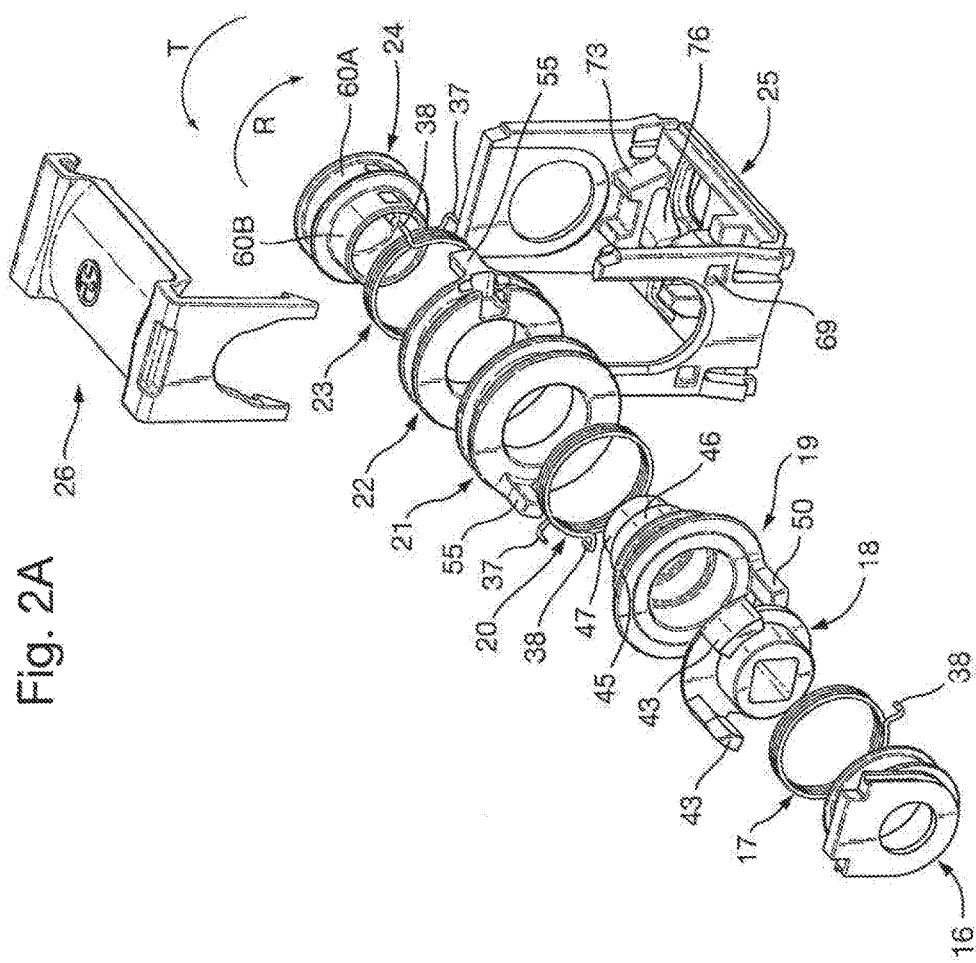
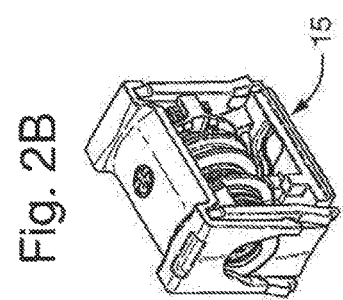

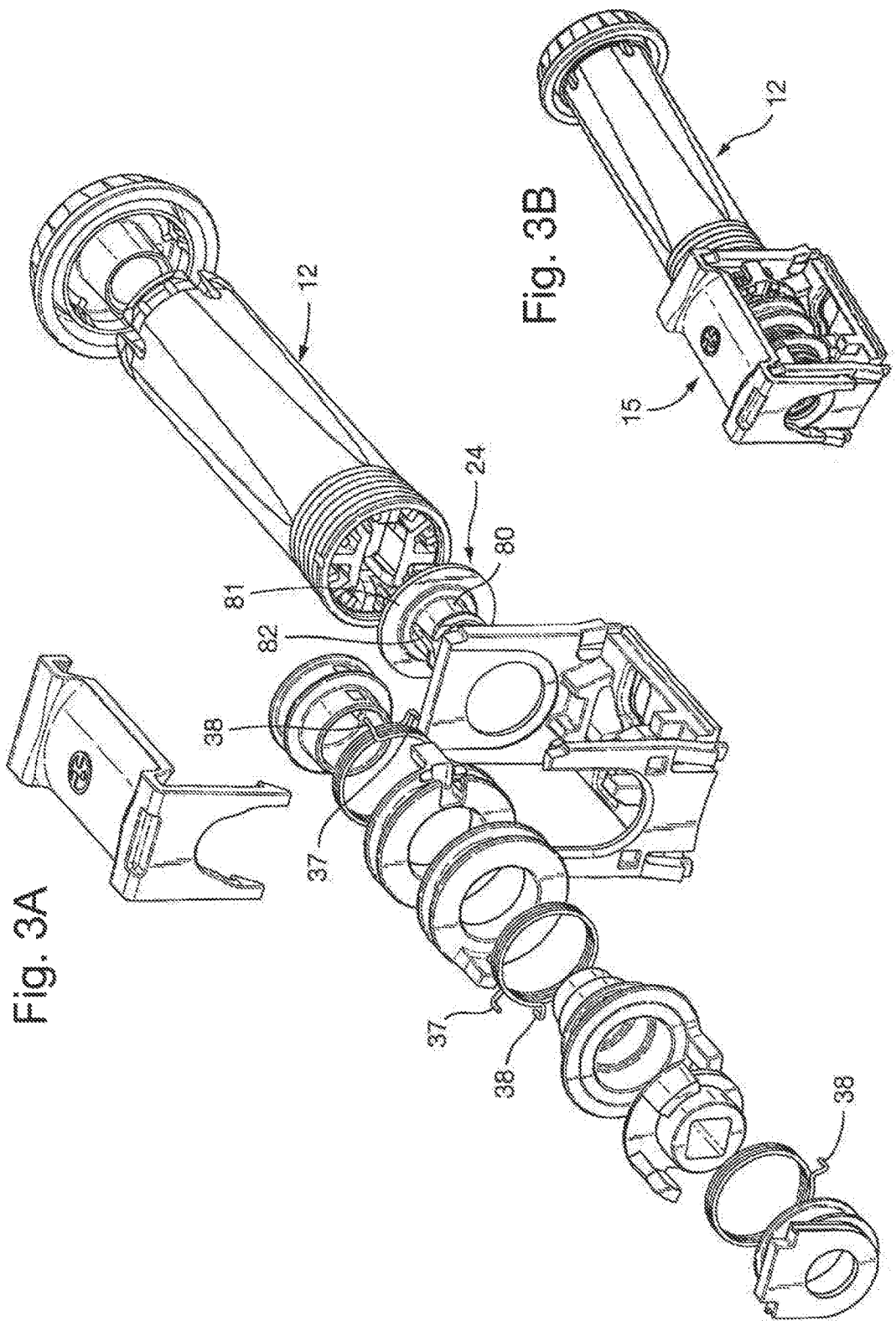

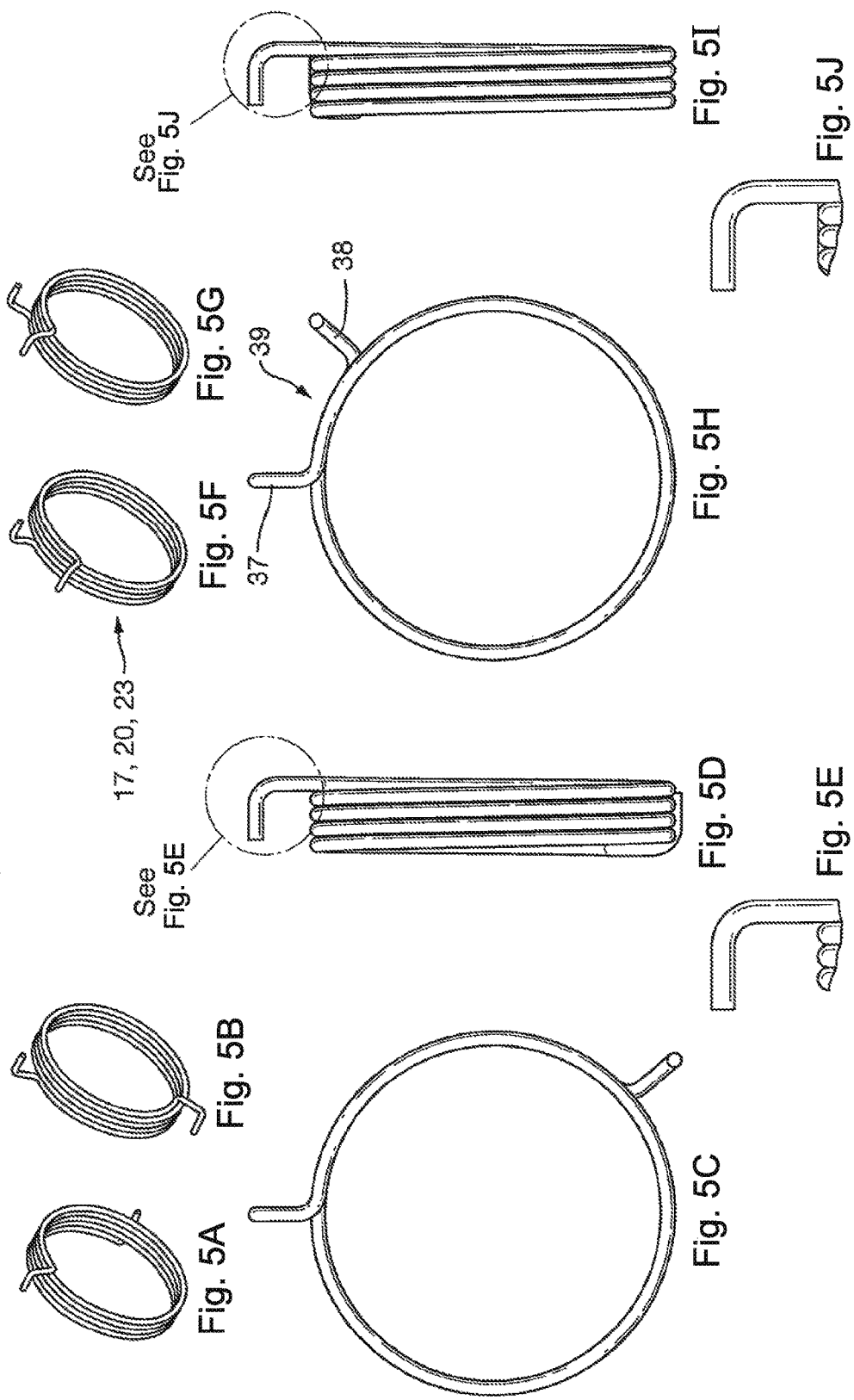

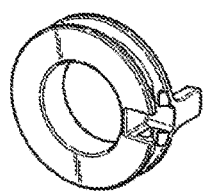
Fig. 8A
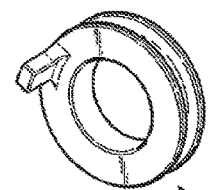
Fig. 8B 21,22
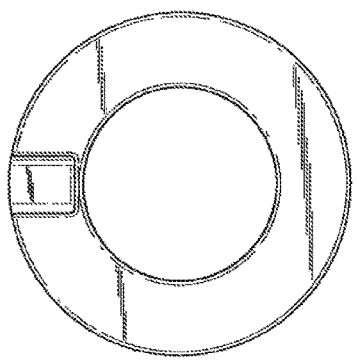
Fig. 8C
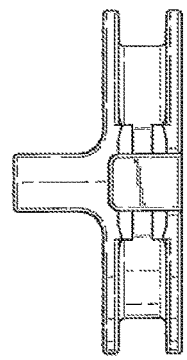
Fig. 8D
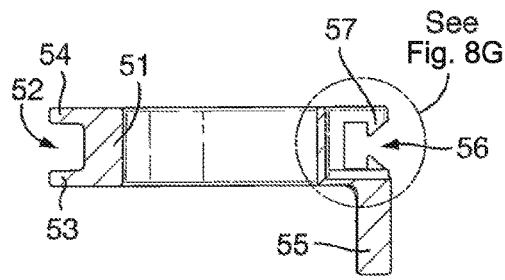
Fig. 8F
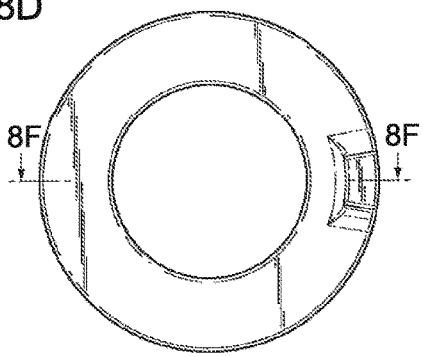
Fig. 8E
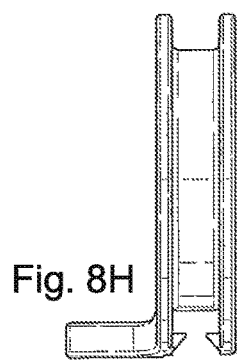
Fig. 8H
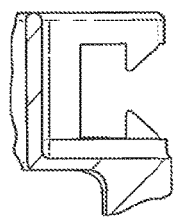
Fig. 8G

24

See Fig. 11G

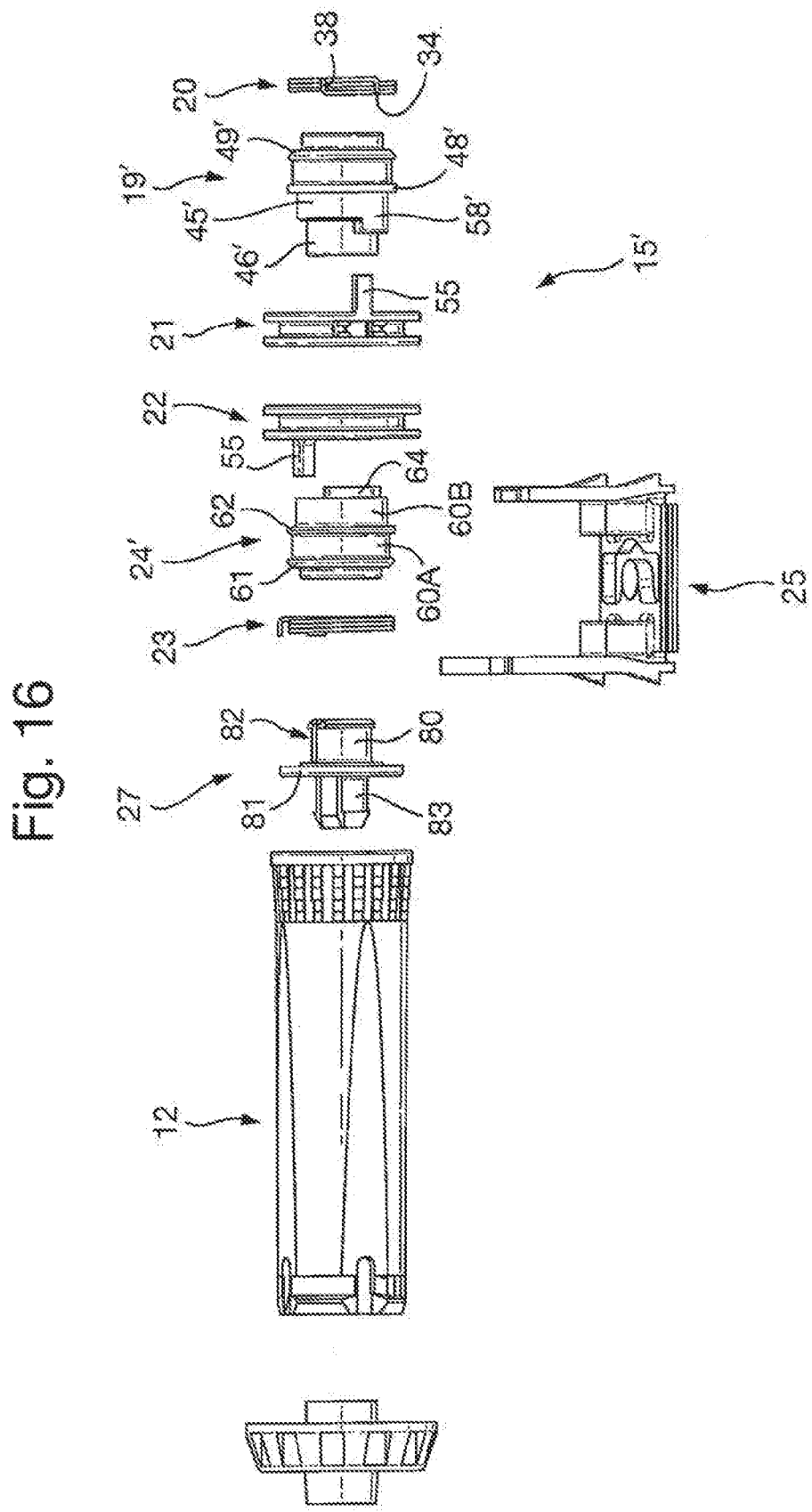

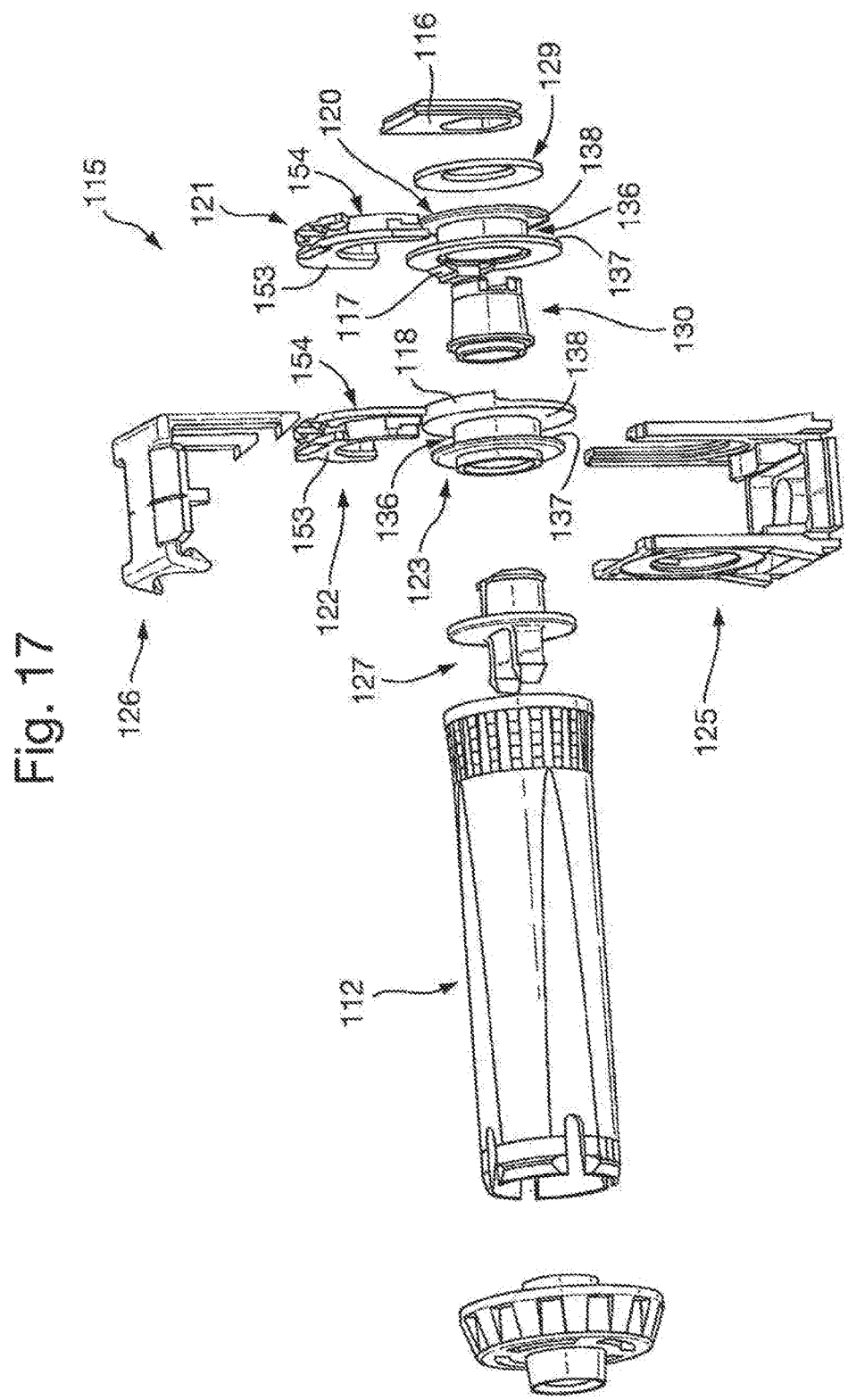

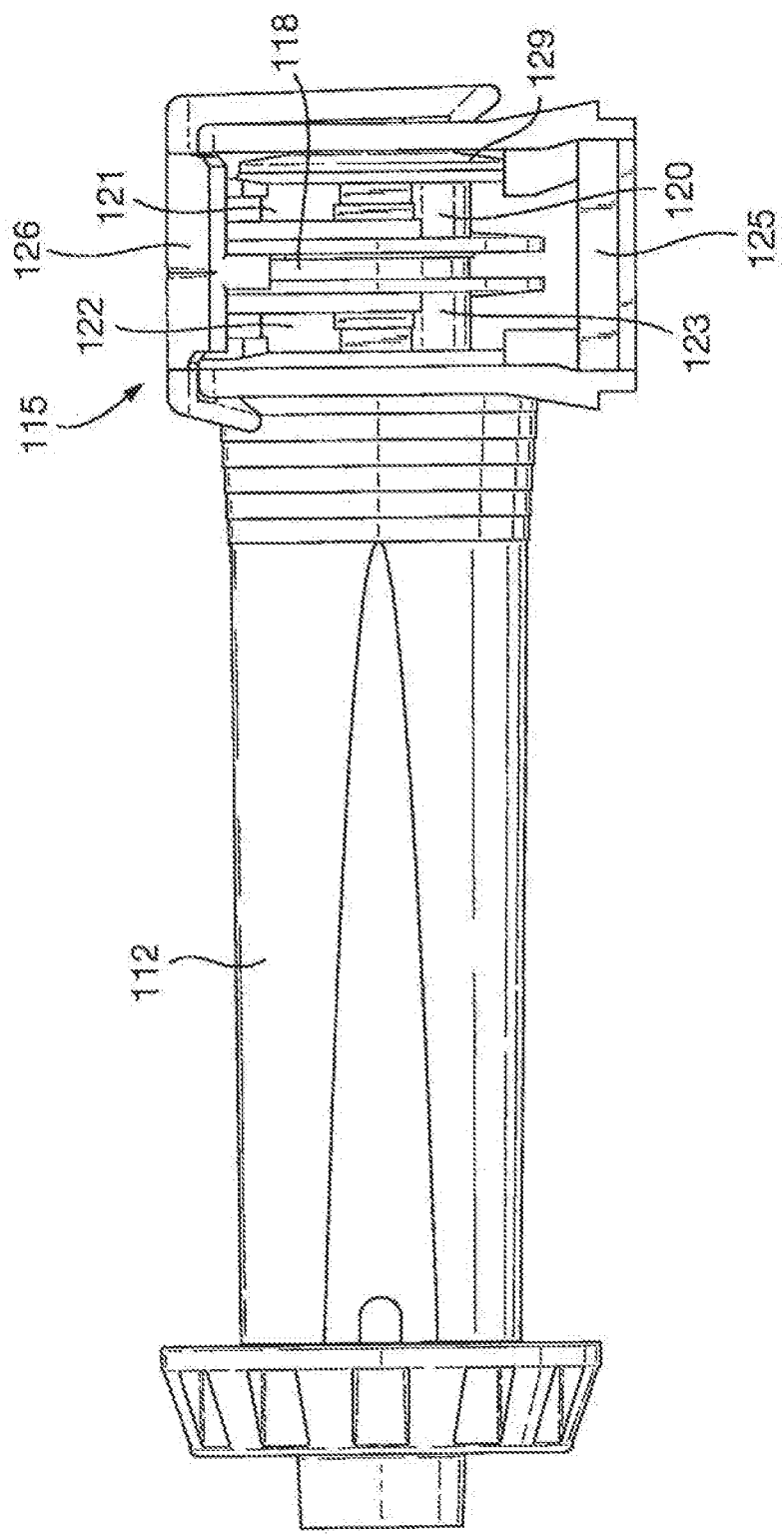

BLIND TILT ASSEMBLY AND METHOD OF CONTROLLING TILT LADDERS

CROSS-REFERENCE TO RELATED APPLICATIONS

This application is a divisional of co-pending U.S. patent application Ser. No. 14/380,613, filed Aug. 22, 2014, entitled "Blind Tilt Assembly and Method of Controlling Tilt Ladders", which is the national stage application of International Patent Application No. PCT/EP2013/053950, filed Feb. 27, 2013, entitled "Blind Tilt Assembly and Method of Controlling Tilt Ladders," which claims priority to European Patent Application No. 12157142.6, filed Feb. 27, 2012, entitled "Blind Tilt Assembly and Method of Controlling Tilt Ladders," which are hereby incorporated by reference herein in their entireties.

FIELD

The present invention relates to a blind tilting assembly and a method of controlling tilt ladders, in particular where the tilt assembly is arranged in or on the head rail of a blind, such as a Venetian blind, for mounting to an architectural opening. The tilt assembly may be used to control cords, cables, ribbons or the like which extend therefrom and operate upon the blind to tilt it.

BACKGROUND

A variety of different types of blind are well known for covering architectural openings. Such blinds may be retracted and deployed across the architectural opening, for instance by means of lift cords. Also, it is known to tilt parallel components of the blind so as to change the appearance of the blind, for example moving between an open state and a closed state, particularly with blinds such as Venetian blinds.

It has been proposed previously to provide Venetian blinds with a double pitch configuration such that, in an open state, pairs of slats are located adjacent one another, leaving double pitch openings between the respective pairs. Arrangements have also been proposed whereby one set of slats can be moved separately from another set of slats, for example where alternate slats are part of one set or, alternatively, the slats of the top half of the blind are part of one set.

U.S. Pat. No. 5,119,868 describes a tilt assembly which is able to control upper and lower sets of Venetian blinds separately. The tilt assembly includes two rotatable drums for controlling respective tilt ladders. An axial spline gear is movable within and between the two drums by means of a horizontally movable control rod. Depending upon whether the inner spline gear is in one or other or both of the drums, it becomes possible to vary the tilt of the upper set of slats, the lower set of slats or both sets of slats.

EP 0 887 507 A2 also relates to a tilting mechanism for a Venetian blind where it is possible to control a top set of slats separately from a bottom set of slats. Tilt ladders for the respective sets are controlled by co axial drums in the tilt assembly. The two drums are rotatable together until they reach the end of an allowable rotation range. At that point, with one of the drums prevented from further rotation, a planetary gear mechanism causes the other drum to reverse its direction of rotation.

WO 2008/150789 describes three different arrangements for controlling two sets of slats. In the first arrangement, co axial drums are provided, in the second arrangement, parallel drums are provided and, in the third arrangement, co axial asymmetric flanges are provided. For the first arrangement, it is recognized that by attaching tilt ladders to the drums differently, it is possible to achieve a double pitch configuration, to tilt alternate slats in opposite directions or to tilt upper and lower sets of slats separately. The drums are driven by a co axial rotatable tilt rod which drives an elongate cylindrical drum driver. The drum driver has a protrusion which extends into a crescent-shaped opening within one of the drums such that the drum driver is able to move freely relative to the drum between the two ends of the opening and then drive rotation of that drum. A lash spring, formed as a coil spring, grips inner portions of the two drums such that they rotate together. By restricting rotation of the other drum, the force of the lash spring may be released so as to allow relative movement between the two drums.

SUMMARY

It is an object of the present invention to provide improvements to the earlier tilt assembly, in particular with regard to the user interface.

The present application recognizes the desirability of providing a tilt assembly which is driven by the same rotational control as used for lifting and lowering a blind.

According to the present invention, there is provided a tilt assembly for a blind including:

a first tilt element (22; 122) and a second tilt element (21; 121), for supporting a pair of tilt ladders; an input connector (24, 27; 24', 27; 127), rotatable about a drive axis and configured to receive a drive shaft for rotating a lift spool and the input connector (24, 27; 24', 27; 127);

a main clutch mechanism (23; 123) for releasably connecting the first tilt element (22; 122) to the input connector (24, 27; 24', 27; 127); a secondary input mechanism (18, 17, 16, 19; 19'; 117, 118) rotatable about the drive axis and configured to receive drive for rotating the secondary input mechanism (18, 17, 16, 19; 19'; 117, 118) with the input connector (24, 27; 24', 27; 127); and a secondary clutch mechanism (20; 120) for releasably connecting the second tilt element (21; 121) to the secondary input mechanism (18, 17, 16, 19; 19'; 117, 118); wherein: with rotation of the drive shaft for rotating a lift spool, the input connector (24, 27; 24', 27; 127) is configured to move the first tilt element (22; 122) and then continue to rotate when released by the main clutch mechanism (23; 123) and the secondary input mechanism (18, 17, 16, 19; 117, 118) is configured to rotate the second tilt element (21; 121) and then continue to rotate when released by the secondary clutch mechanism (20; 120).

The tilt elements may for instance be ring segments or wedges in frictional engagement with spools. Alternatively, the tilt elements may be tilt rings in which case the invention provides a tilt assembly for a blind including:

a first tilt ring (22) and a second tilt ring (21), both rotatable about a drive axis for supporting a pair of tilt ladders;

an input connector (24, 27), rotatable about the drive axis and configured to receive a drive shaft for rotating a lift spool and the input connector (24, 27);

a main clutch mechanism (23) for releasably connecting the first tilt ring (22) to the input connector (24, 27) and configured to release connection at each of two opposite rotational orientations of the first tilt ring (22);

a secondary input mechanism (18, 17, 16, 19) rotatable about the drive axis and configured to receive drive for rotating the secondary input mechanism (18, 17, 16, 19) with the input connector (24, 27); and a secondary clutch mechanism (20) for releasably connecting the second tilt ring (21) to the secondary input mechanism (23); wherein:

with rotation of the drive shaft for rotating a lift spool, the input connector (24, 27) is configured to rotate the first tilt ring (22) to one of the two opposite rotational orientations and then continue to rotate when released by the main clutch mechanism (23) and the secondary input mechanism (18, 17, 16, 19) is configured to rotate the second tilt ring (22) to one of the two opposite rotational orientations and then continue to rotate when released by the secondary clutch mechanism (20).

In this way, it becomes possible to drive both tilt rings using the same drive as used for lifting the blind. In particular, both tilt rings are configured to release from the drive once they have reached either of their maximum rotational orientations. When the common drive is rotated, the tilt rings are first rotated together with rotation of a lift spool for lifting the blind, but once the tilt rings reach their rotational limits such that the blind is fully tilted, the drive is able to continue to rotate to continue lifting or lowering the blind.

Optionally, the tilt assembly includes a delay mechanism (18, 17, 19) configured to receive drive from the drive shaft and to rotate freely through a predetermined angle before transferring drive to and rotating the second tilt element, e.g. ring segment (121) or tilt ring (21).

Optionally the secondary input mechanism (18, 17, 16, 19) is configured to receive the drive shaft and includes the delay mechanism (18, 17, 19), and the secondary clutch mechanism (20) may be configured to release connection at each of two opposite rotational orientations of the first second ring (21).

The secondary input mechanism, secondary clutch mechanism and delay mechanism may alternatively be provided by configuring the first and second tilt rings to mutually engage and disengage with a delay such that the first tilt ring provides delayed rotational drive to the second. In this way, the second tilt ring is rotated at some point after the first tilt ring is rotated. This provides a convenient system allowing separate control of the first and second tilt rings. In particular, with rotation of the common drive, the first tilt ring is rotated and then the second tilt ring is rotated. After the first tilt ring reaches its predetermined maximum rotational orientation, the second tilt ring and the lift spool are able to continue to rotate. Once the second tilt ring then reaches its predetermined maximum rotational orientation, the tilt spool is still able to rotate.

Optionally, the secondary input mechanism includes: an input part (18) configured to receive drive from and rotate with the drive shaft on the drive axis; and a transfer part (17, 19) configured to transfer drive from the input part (18) to the second tilt ring (21); wherein:

the input part (18) and the transfer part (17, 19) have respective engagement portions (43, 37, 38) at respective circumferential regions which allow a predetermined range of relative rotation between the driven part (18) and the transfer part (17, 19) before the driven part (18) drives the transfer part (17, 19).

This arrangement provides an advantageous and convenient way of delaying the transfer drive from the common drive shaft to the second tilt ring.

Optionally, the transfer part includes:

a transfer torsion spring (17) having engagement tangs (37, 38) at respective ends; and a slave part (19) having at a radial periphery an axially extending finger (50) engaged between the engagement tangs (37, 38) of the transfer torsion spring (17).

In this way, transfer of drive is effectively provided.

In particular, optionally the input part (18) has, at a radial periphery, at least one axially extending prong (43) configured to engage with the engagement tangs (37, 38) of the transfer torsion spring (17) at opposite ends of the predetermined range of relative rotation.

Optionally, the tilt assembly may further include:

a stationary spring holder (16) having an outer cylindrical surface coaxial with the drive axis; wherein the transfer torsion spring (17) wraps around the outer cylindrical surface of the stationary spring holder (16) so as to releasably engage with the stationary spring holder (16) and resist relative rotation; and the transfer torsion spring (17) is configured to release engagement with the stationary spring holder (16) in response to pressure of the prong (43) on an engagement tang (37, 38) such that the transfer part (17, 19) rotates with the input part (18).

In this way, the transfer torsion spring grips the stationary spring holder so as to prevent any rotation of the second tilt ring until the prong of the input part has moved through its predetermined range of rotation so as to release the transfer torsion spring from the stationary spring holder.

The tilt assembly may include a housing and the stationary spring holder may be non-rotatably mounted to the housing.

Optionally, the secondary clutch mechanism includes:

a secondary torsion spring (20) having engagement tangs (37, 38) at respective ends;

the tilt assembly includes secondary fixed stops (75); and the engagement tangs (37, 38) of the secondary torsion spring (20) are configured to be brought into engagement with respective secondary fixed stops (75) by rotation of the secondary torsion spring (20) about the drive axis, the secondary fixed stops (75) preventing further rotation of the engagement tangs (37, 38) of the secondary torsion spring (20) and preventing further rotation of the second tilt ring (21).

This provides an advantageous arrangement for disengaging drive to the second tilt ring once it has reached the required predetermined rotational orientation for the tilt of any slats.

Optionally, the secondary torsion spring wraps around an outer cylindrical portion (45) of the secondary input mechanism (18, 17, 16, 19) so as to releasably engage with the secondary input mechanism (18, 17, 16, 19).

In a preferred embodiment, the outer cylindrical portion of the secondary input mechanism is provided on the slave part.

Optionally, the second tilt ring includes a limit stop (55) extending axially from a peripheral portion of the second tilt ring (21) and engageable between the tangs (37, 38) of the secondary torsion spring (20).

Where the tilt assembly includes a housing, the base plate of the housing may include the respective secondary fixed stops (75).

Optionally, the main clutch mechanism includes:

a main torsion spring (23) having engagement tangs (37, 38) at respective ends;

the tilt assembly includes main fixed stops (73); and the engagement tangs (37, 38) of the main torsion spring (23) are configured to be brought into engagement with respective main fixed stops (73) by rotation of the torsion spring about the drive axis, the main fixed steps (73) preventing further rotation of the engagement tangs (37, 38)

of the main torsion spring (23) and preventing further rotation of the first tilt ring (22).

This provides an advantageous arrangement for allowing disengagement of drive to the first tilt ring once it has reached either of the required orientations for the tilt of the slats.

Optionally, the main torsion spring wraps around an outer cylindrical portion (60B) of the input connector (24, 27) so as to releasably engage with the input connector (24, 27).

Optionally, the first tilt ring includes a limit stop (55) extending axially from a peripheral portion of the first tilt ring (22) and engageable between the tangs (37, 38) of the main torsion spring (23).

The releasable connection of the rotational drive to the tilt cords does not have to be provided by clutch mechanisms releasably connecting the drive to the tilt rings but could be by releasably connecting the tilt rings to the tilt cords. For example, the releasable function can be provided by use of wedges, constituting tilt elements, which are releasably jammed into grooves of the tilt rings under gravity by having the tilt cords pass over them, and the wedges are released from the tilt rings by being lifted out of the grooves on engagement with stop formations, thus allowing the tilt ring to continue to rotate without moving the tilt cord.

The clutches do not need to be provided by means of torsion springs but other forms of clutch are usable.

Where the tilt assembly includes a housing, the base plates may include the respective main fixed stops.

In one embodiment the tilt assembly includes a housing (25) having a base plate (65) defining a first opening (71) for passing a pair of tilt ladders to the first tilt ring (22) and second tilt ring (21) and further defining a second opening (72) for passing a lift cord.

The tilt assembly may be provided additionally with the lift spool (12) for winding and unwinding a lift cord and configured to connect with the input connector (24, 27) for simultaneous rotation by a common drive shaft.

According to one particularly advantageous design, either of the tilt rings may include:

a circumferential groove (52) formed between first and second flanges (53, 54) at opposite respective axial ends of the tilt ring (21, 22); and a member (55') extending, at one portion of a periphery of the first flange (53), to the second flange (54) so as to face the groove (52); wherein the second flange (54) defines a recess (58) providing a gap between the second flange (54) and the member (55'); and the member defines an aperture for receiving a fastener to extend into the groove (52) to secure a tilt ladder in the groove (52).

In this respect, according to the present invention, there may be provided a tilt ring for the tilt assembly of a blind and for supporting a tilt ladder, the tilt ring (21, 22) including:

a circumferential groove (52) formed between first and second flanges (53, 54) at opposite respective axial ends of the tilt ring (21, 22); and a member (55') extending, at one portion of a periphery of the first flange (53), to the second flange (54) so as to face the groove (52); wherein the second flange (54) defines a recess (58) providing a gap between the second flange (54) and the member (55'); and the member defines an aperture for receiving a fastener (59) to extend into the groove (52) to secure a tilt ladder in the groove (52).

According to the present invention, there is also provided a method of controlling tilt ladders with the drive shaft of a lift spool using a tilt assembly having a first tilt ring (22) and a second tilt ring (21) both rotatable about a drive axis, the method including:

providing rotatable drive from the lift spool to rotate an input connector (24, 27) and a secondary input mechanism (18, 17, 16, 19) of the tilt assembly, both being rotatable about the drive axis;

releasably connecting the first tilt ring (22) to the input connector (24, 27) and releasing connection at each of two opposite rotational orientations of the first tilt ring (22); and releasably connecting the second tilt ring (21) to the secondary input mechanism (18, 17, 16, 19) and releasing connection at each of two opposite rotational orientations of the second tilt ring (21).

BRIEF DESCRIPTION OF THE DRAWINGS

The invention will be more clearly understood from the following description given by way of example only, with reference to the accompanying drawings in which:

FIG. 1 shows a Venetian blind equipped with a tilt assembly according to the invention;

FIGS. 2A, 2B show the tilt assembly according to the invention, in exploded and assembled view respectively;

FIGS. 3A, 3B show a tilt-lift assembly according to the invention, in exploded and assembled view respectively;

FIGS. 5A-5J show the torsions springs of the tilt assembly;

FIGS. 8A-8H show the tilt rings of the tilt assembly;

FIG. 16 shows a further embodiment of a tilt-lift assembly according to the invention, in exploded view;

FIG. 17 shows a further embodiment of a tilt-lift assembly according to the invention, in exploded view; and FIG. 18 shows the tilt-lift assembly of FIG. 17 in assembled condition.

DETAILED DESCRIPTION

Figures 4A, 4B:
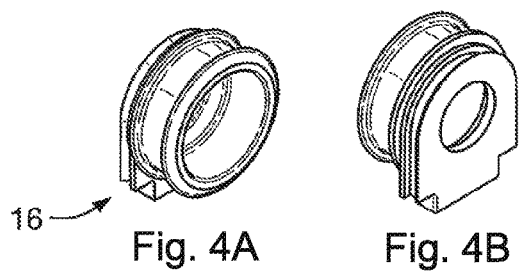
FIGS. 4A-4H show the stationary spring holder of the tilt assembly.
Figures 4C, 4D, 4E:
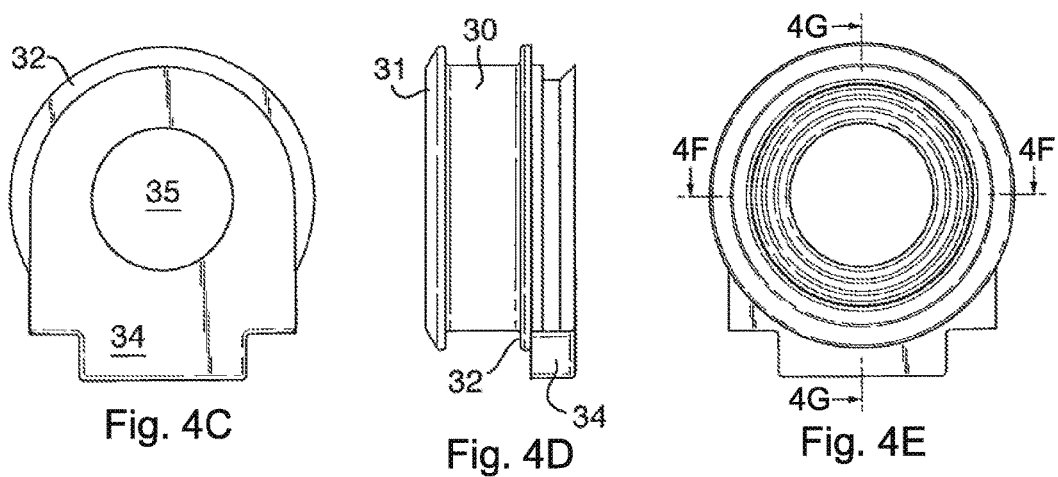
Figures 4F, 4G, 4H:
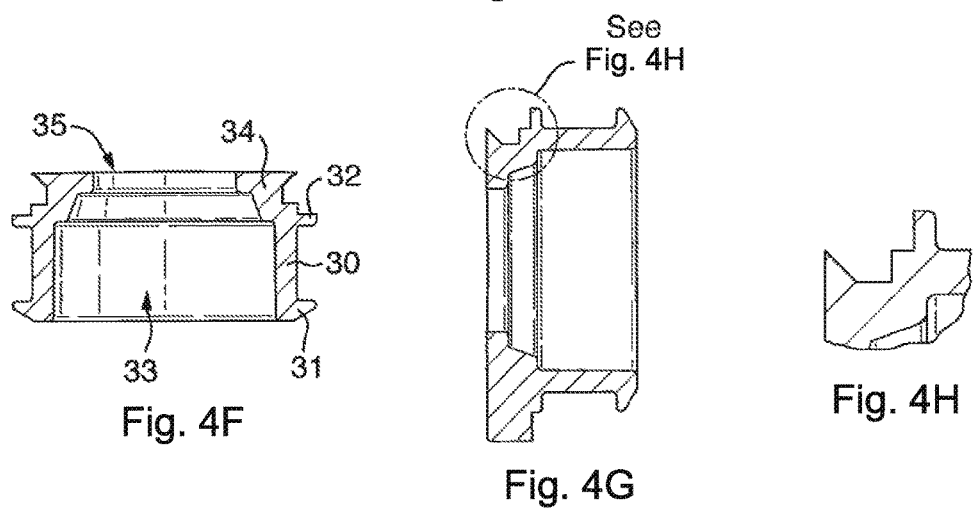
Figure 6A:
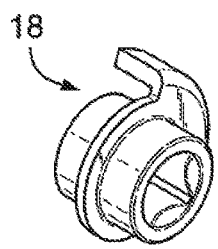
FIGS. 6A-6F show the spring catcher of the tilt assembly.
Figure 6B:
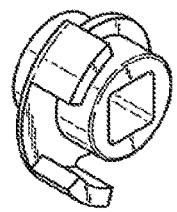
Figure 6C:
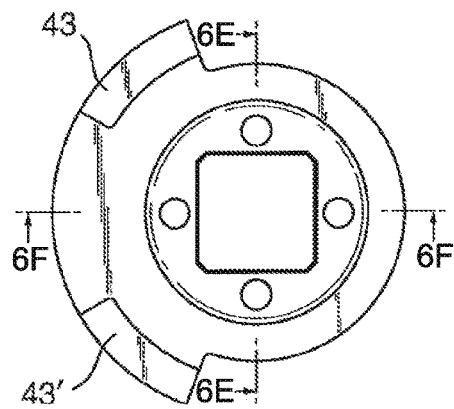
Figure 6D:
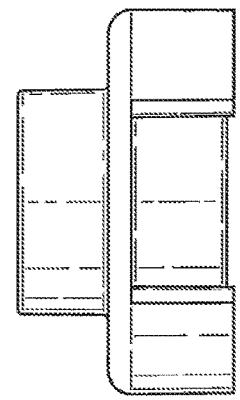
Figure 6E:
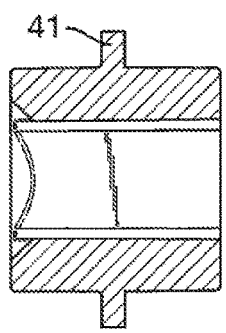
Figure 6F:
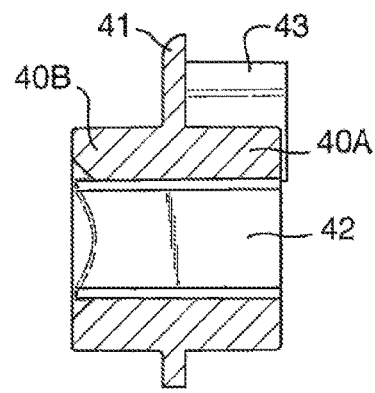
Figure 7A:
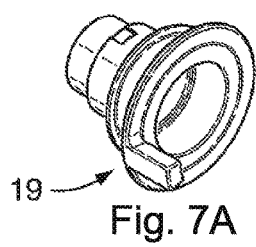
FIGS. 7A-7F show the slave spring holder of the tilt assembly.
Figure 7B:
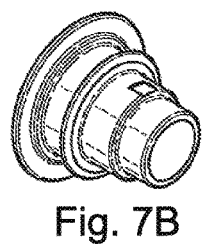
Figure 7C:
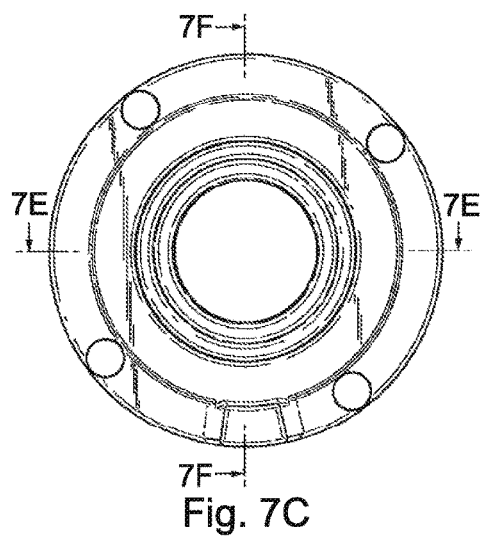
Figure 7D:
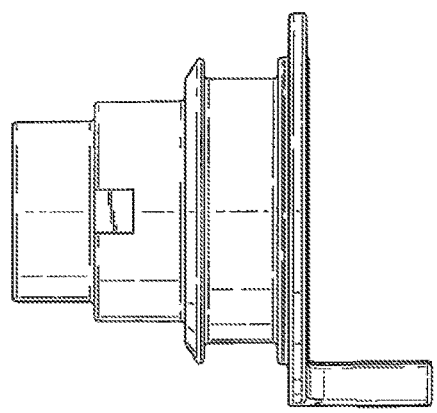
Figure 7E:
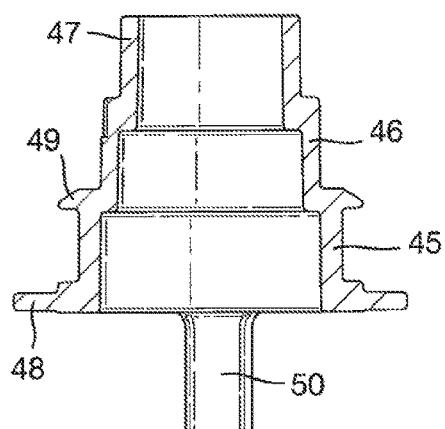
Figure 7F:
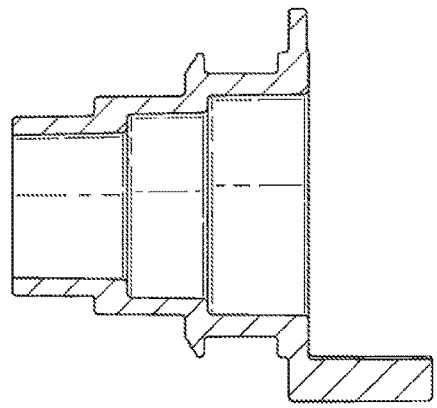
Figure 9A:
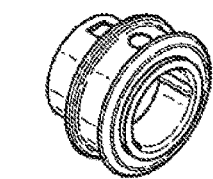
FIGS. 9A-9G show the master spring holder of the tilt assembly.
Figure 9B:
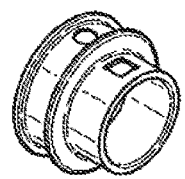
Figure 9C:
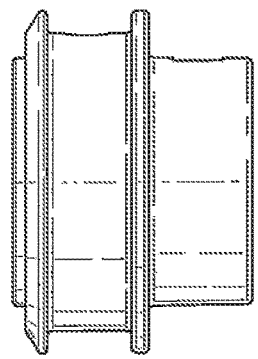
Figure 9D:
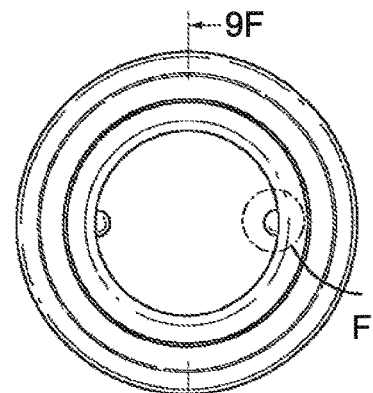
Figure 9E:
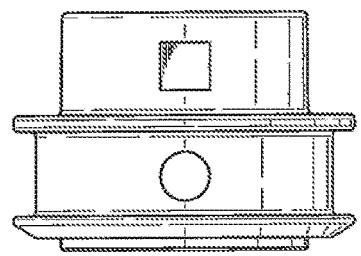
Figure 9F:
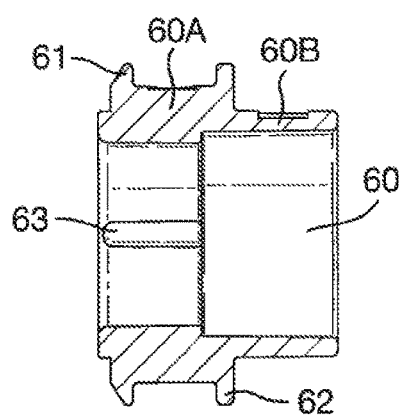
Figure 9G:
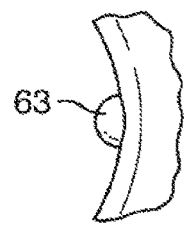
Figures 10A, 10B:
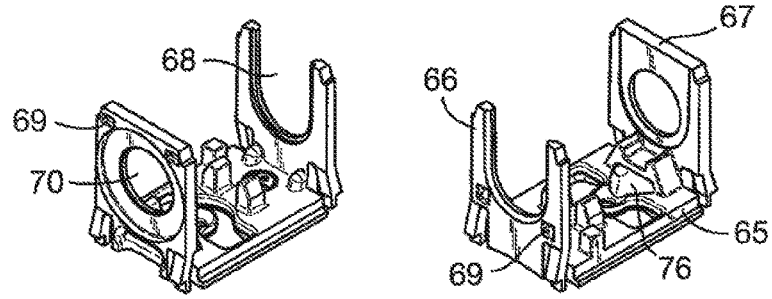
FIGS. 10A-10G show the housing of the tilt assembly.
Figure 10C:
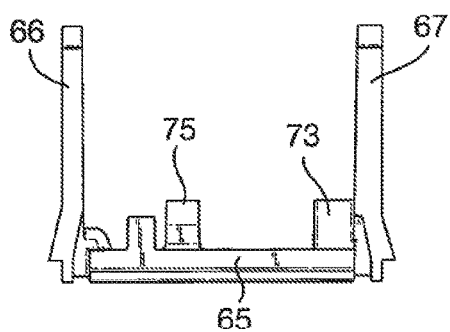
Figure 10D:
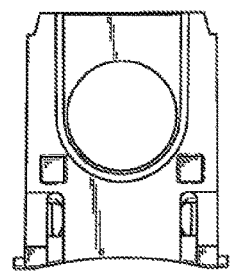
Figure 10G:
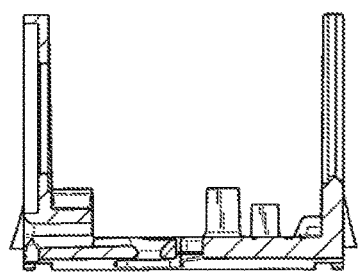
Figure 10E:
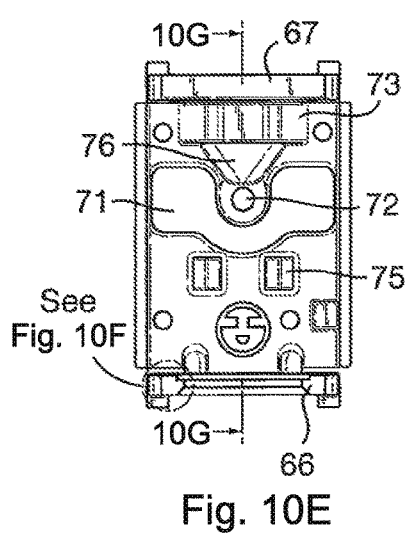
Figure 10F:
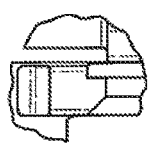
Figure 11A:
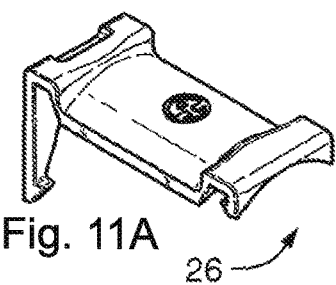
FIGS. 11A-11H show the cover of the tilt assembly.
Figure 11B:
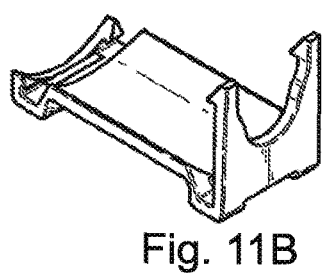
Figure 11C:
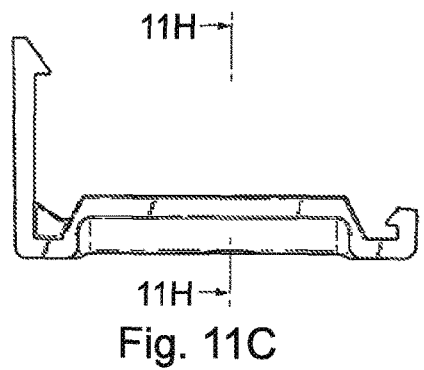
Figure 11D:
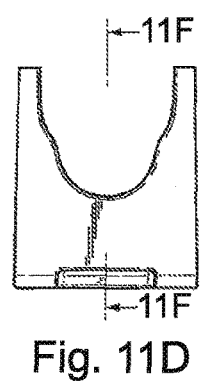
Figure 11E:
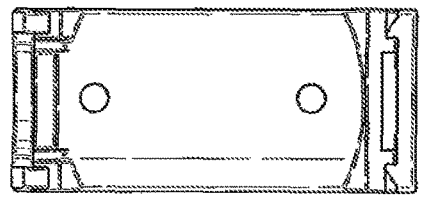
Figure 11F:
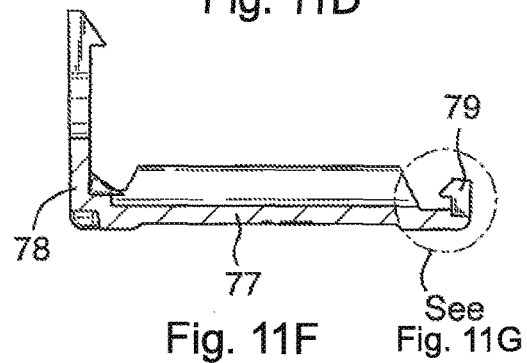
Figure 11H:
Figure 11G:
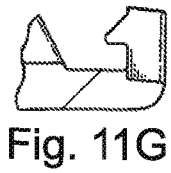

FIG. 1 shows a Venetian blind 1, comprising a head rail 2, a bottom rail 3, and a stack of slats 4 extending there between. The bottom rail 3 is suspended from the head rail 2 by means of at least two lift cords 5, which pass through holes in the slats 4. The slats 4 are suspended from the head rail 2 by means of at least two pairs of tilt ladders also referred to as ladder cords 6A,B, each ladder cord 6A,B having two tilt cords one (6AF resp. 6BF) extending along the front side of the slats 4, and one (6AR resp. 6BR)

extending along the rear side of the slats 4 (not visible in FIG. 1) and a number of cross rungs 8A,B (also not visible in FIG. 1) that connect the front and rear tilt cord (6AF, 6AR; 6BF, 6BR) and support the individual slats 4. The blind 1 further comprises a drive shaft 10, which in the illustrated embodiment has a square cross section, and that is rotatably mounted in the head rail 2. The blind 1, further comprises operating means 11 (not shown in FIG. 1) for rotating the drive shaft 10. The operating means 11 may for instance comprise a motor, wand or ball chain, or any other drive means suitable to rotate the shaft 10. The drive shaft 10 is provided with at least two cord spools 12, for winding and unwinding the lift cords 5, and at least two tilt assemblies 15, for manipulating the ladder cord pairs 6A,B, so as to change the tilt angle of the slats 4.

FIGS. 2A and 2B show the tilt assembly 15 in exploded view and assembled view. FIGS. 3A and 3B show the same tilt assembly 15 in combination with a cord spool 12, again in exploded view and assembled view.

Detailed Description of the Components

The tilt assembly 15 comprises, as seen from left to right in FIGS. 2A and 3A, a stationary spring holder 16, a first torsion spring 17, a spring catcher 18, a slave spring holder 19, a second torsion spring 20, a second tilt ring 21, a first tilt ring 22, a third torsion spring 23, a master spring holder 24, a housing 25, a cover 26 and a cord spool connector 27.

In use, one pair of ladder cords 6A,B is attached to one tilt assembly 15. More particularly, one ladder cord 6A is attached to the second tilt ring 21 and the other ladder cord 6B is attached to the first tilt ring 22. The master spring holder 24, third torsion spring 23 and housing 25 together control rotation of the first tilt ring 22, whereas the rotation of the second tilt ring 21 is controlled by the spring catcher 18, the first and second torsion spring 17, 20 and the slave spring holder 19. This will be explained in further detail below, but first the individual components will be described in further detail.

The stationary spring holder 16 (see FIGS. 4A-4H) comprises a cylindrical main body 30 that is surrounded by two radial flanges 31, 32 and further comprises a bore 33. At one end of the main body 30 a U-shaped end flange 34 is provided, with an opening 35 of which the diameter is smaller than that of the bore 33 but is big enough to let the drive shaft 10 through.

In use, the stationary spring holder 16 acts as stationary support for the first torsion spring 17 and spring catcher 18.

The first, second and third torsion spring 17, 20, 23 all have the same configuration. FIGS. 5A-5J illustrate any one of first, second, third torsion springs 17, 20, 23 in a tensioned state. The ends of the springs are bend outward so as to form L-shaped tangs 37, 38 with one leg of the tang extending radially outward and another leg extending in axial direction. Between the tangs 37, 38 a reception opening 39 is formed. By moving the tangs 37, 38 towards each other, i.e. by reducing the reception opening 39, the inner diameter of the springs will increase. Vice versa, by moving the tangs 37, 38 apart, i.e. by increasing the reception opening 39, the spring's inner diameter will decrease.

In use, the torsion springs 17, 20, 23 act as clutches, wherein the second 20 and third 23 clutch enable the drive shaft to continue rotating (for lifting lowering the slats) while the tilt rings are stationary in one of their end positions (no tilting). The first clutch 17 determines together with spring catcher 18, the delay in rotation of the second tilt ring 21 with regard to the first tilt ring 22.

The spring catcher 18 (see FIGS. 6A-6F) has a cylindrical main body 40 that is surrounded by a radial flange 41 and further comprises a bore 42 with a cross section that corresponds to that of the drive shaft 10. The radial flange 41 divides the main body 40 into a first portion 40A and a second portion 40B. The flange 41 is provided with at least one prong 43 that extends along the first portion 40A of the main body, substantially parallel thereto and at some distance there from. More particularly, the prong 43 is located at the same radial distance from the centre line as the tangs 37, 38 of the torsion springs 17, 20, 23. In the illustrated embodiment, two prongs 43, 43' are provided, but this is not essential for the invention.

The slave spring holder 19 (see FIGS. 7A-7F) has a cylindrical body with a stepped outer and inner diameter dividing the body in three portions: a first portion 45 of largest outer and inner diameter, a second portion 46 of smaller outer and inner diameter, and a third portion 47 of smallest outer and inner diameter. The first portion 45 is surrounded by two radial flanges 48, 49 and further comprises a catch finger 50 that projects axially outward from its free edge, at the same radius as the tangs 37, 38 of the torsion springs and the prong 43 of the spring catcher 18.

Figure 15:
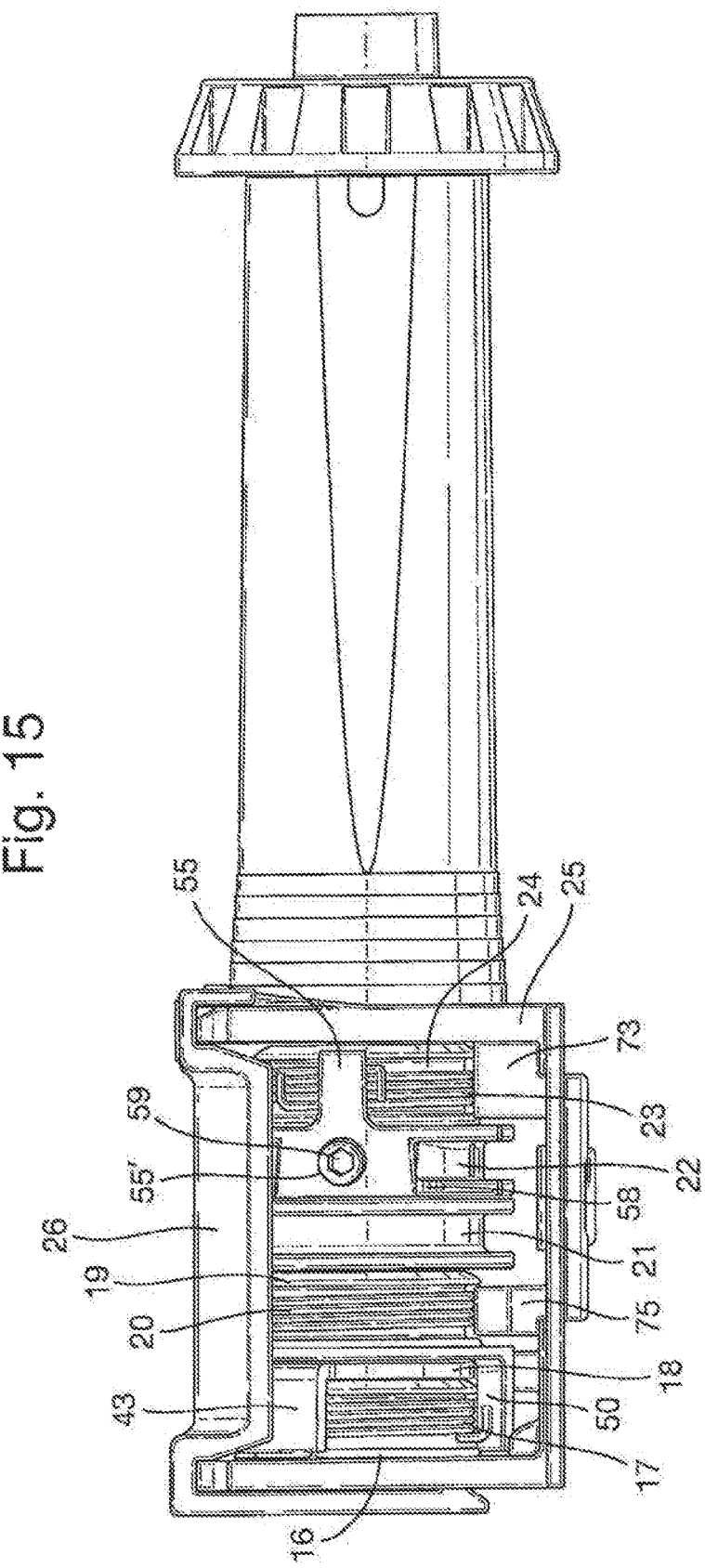
FIG. 15 shows the tilt-lift assembly in frontal view.

The first and second tilt ring 22, 21 have the same configuration as each other. FIGS. 8A-8H illustrate either of tilt rings 21 and 22. Each tilt ring 21, 22 has a pulley shaped main body 51 with a groove 52 formed between two flanges 53, 54. One of the flanges 53 is provided with a limit stop 55, which projects outward by in the axial direction, at the same radius as the tangs 37, 38 of the torsion springs, prong 43 and catch finger 50. Each tilt ring 21, 22 further comprises cord clamp provision 56 for securing a respective one of the ladder cords 6A,B in place. In the embodiment of FIGS. 8A-8H, this cord clamp provision 56 comprise barbs 57, projecting inward from the flanges 53, 54. In an alternative embodiment (as best seen in FIG. 15) the flange limit stop 55 may be prolonged at its other side so as to extend over the groove 52 up to the other flange 54. This other flange 54 may be locally provided with a recess 58 so as to create a gap between said flange 54 and the prolonged limit stop 55' that provides access to the groove 52. A hole may be provided in the extended limit stop 55' for receiving a fastener 59 that after mounting of a ladder cord 6A, resp. 6B in the groove 52 can be tightened to secure the cord 6A,B in place.

The master spring holder 24 (see FIGS. 9A-9G) comprises a cylindrical main body 60, of which a first half 60A is surrounded by two flanges 61, 62. At the inner side of the first half 60A, two ribs 63 are provided, extending in axial direction, at diametrically opposed positions.

The housing 25 (see FIGS. 10A-10G) comprises a rectangular base plate 65 which near its short sides is provided with two side walls 66, 67. The first side wall 66 has a U-shaped recess 68 and is further at its outward facing side provided with two recesses 69. The second side wall 67 has a circular opening 70 and is at its outward facing side provided with similar recesses 69 as the first side wall. A substantially C-shaped first opening 71 is provided in the base plate 65, somewhat nearer to the second side wall 67 than to the first side wall 66. A much smaller second opening 72 is provided in the base plate portion that is surrounded by the C-shaped opening 71. Further, two stop formations 73, 75 are provided on the base plate 65 on either side of the first opening 71 with the first stop formation 73 adjoining the second side wall 67 and the second stop formation 75 being located right across the first opening 71, at some distance from the first side wall 66. A third opening 76 is provided, that extends through the first stop formation 73 and the second side wall 67.

The cover 26 (see FIGS. 11A-11H) comprise a rectangular top plate 77 which near its short sides is provided with two click fingers 78, 79.

The cord spool connector 27 (see FIGS. 3A and 3B) comprises a cylindrical main body 80, which at one end is surrounded by a flange 81. The main body 80 is provided with two diametrically opposed slots 82, extending in axial direction up to the flange 81. The flange 81 is at its other side provided with suitable coupling means (not visible), e.g. two or more click fingers for securing the connector 27 to the cord spool 12 in a non-rotatable way.

The cord spool 12 (see FIGS. 3A and 3B) may for instance be configured as described in applicant's international application PCT/EP2011/001656.

Assembled Condition

To assemble the tilt assembly 15, the first torsion spring 17 is mounted on the stationary spring holder 16 between its flanges 31, 32. The second torsion spring 20 is mounted on the first portion 45 of the slave spring holder 19, between its flanges 48, 49. The third torsion spring 23 is mounted on the first half 60A of the master spring holder 24, between its flanges 61, 62. The outer diameter of the respective components 16, 45, 60A is slightly larger than the inner diameter of the untensioned torsion springs 17, 20, 23. Thus, during mounting the tangs 37, 38 will move towards each thereby causing the springs' diameter to increase and causing the springs to become tensioned. Thanks to this tension, the springs will be clamped around the components 16, 45, 60A with some clamping force, which prevents the torsion springs 17, 20, 23 from rotating relative to their respective components 16, 45, 60A.

Next, the first portion 40A of the spring catcher 18 is inserted in the stationary spring holder 16 and the second portion 40B is inserted in the slave spring holder 19. The relative orientation of the respective components is such that the catch finger 50 of the slave spring holder 19 is received in the reception opening 39 between the tangs 37, 38 of the first torsion spring 17 and the or each prong 43 of the spring catcher 18 lies outside said reception opening 39.

Next, the second tilt ring 21 is mounted on the second portion 46 of the slave spring holder 19 with its limit stop 55 extending in the reception opening 39 between the tangs 37, 38 of the second torsion spring 20, and the first tilt ring 22 is mounted on the second half 60B of the master spring holder 24 with its limit stop 55 extending in the reception opening 39 between the tangs 37, 38 of the third torsion spring 23.

Next, the third portion 47 of the slave spring holder 19 is inserted in the second half 60B of the master spring holder 24.

Meanwhile, a pair of ladder cords 6A, 6B is inserted into the housing 25 through the first opening 71, and a lift cord 5 is inserted into the housing 25 through the second opening 72 and guided out off the housing 25 via the third opening 76.

Next, the ladder cords 6A, 6B are mounted around the first 22 and second 21 tilt ring and secured in place by means of the cord clamp provision 56 or 59. As will be explained below in further detail, there are several ways to mount the ladder cords 6A, 6B with respect to the tilt rings 21, 22 and this will determine the ways in which the slats can be tilted.

The sub-assembly resulting from the foregoing assembly steps is lowered into the housing 25 such that the U-shaped end flange 34 of the stationary spring holder 16 is received in the U-shaped slot 68 in the first side wall 66, thereby ensuring that the spring holder 16 is held stationary in the housing 25.

Next, the main body 80 of the cord spool connector 27 is inserted through the opening 70 in the second side wall 67 of the housing 25 and into the first half 60A of the master spring holder 24, where the slots 82 engage the ribs 63 to establish a non-rotatable connection between the cord spool connector 27 and the master spring holder 24. The cord spool connector 27 itself is rotatably supported in the opening 70.

Next, the cord spool 12 is snap fitted onto the coupling means of the cord spool connector 27 so as to establish a non-rotatable connection there between.

Next, the lift cord 5 which exits the housing 25 through the third opening 76 is guided along what in FIG. 1 would be the rear side of the cord spool 12, and is attached to the end of the cord spool 12 that faces away from the tilt assembly 15. The assembly is subsequently mounted onto the drive shaft 10.

Finally, the housing 25 is closed by snapfitting the cover 26 in place, wherein the barb shaped end portions of the click fingers 78, 79 lock behind the recesses 69 in the first and second side wall 66, 67. The cover 26 helps to keep the ladder cords 6A, 6B into the grooves 52 of the tilt rings 21, 22 and thus prevents the cords 6A, 6B from falling of the tilt rings or becoming tangled or misaligned.

Operation of the Tilt Assembly

In an initial position (when the blind is fully retracted) the first tangs 37 of the second and third torsion spring 20, 23 respectively abut the right hand side (as seen in FIG. 2A) of the first and second stop formation 73, 75. The limit stop 55 of the first and second tilt ring 22, 21 abut said first tangs 37. Accordingly, both tilt rings 21, 22 lie in a first end position in which these rings are prevented from rotating in clockwise direction (as indicated by arrow R in FIG. 2A). The position of the tangs 37, 38 of the first torsion spring 17 may vary (no fixed position). However, the prong 43 of the spring catcher 18 will lie in abutment with the second tang 38 of the first torsion spring 17.

When the drive shaft 10 is rotated counter clockwise (in the direction of Arrow T in FIG. 2A), the cord spool 12 will start to rotate counter clockwise and with that the master spring holder 24 (by means of the cord spool connector 27 which non-rotatably connects the master spring holder 24 to the cord spool 12). The third torsion spring 23 rotates with the master spring holder 24, taking along between its tangs 37, 38 the limit stop 55 of the first tilt ring 22 and with that, the first tilt ring 22 itself. Since the spring catcher 18 is non-rotatably connected to the drive shaft 10 via its square shaped bore, the rotation of the drive shaft 10 will cause the spring catcher 18 to rotate in counter clock wise direction as well, causing its prong 43 to move away from the second tang 38 of the first torsion spring 17.

As the drive shaft is further rotated in counterclockwise direction, the prong 43 will come in abutment with the first tang 37 of the first torsion spring 17 and upon further rotation will urge said first tang 37 towards the second tang 38, causing the first spring 17 to open (i.e. its inner diameter to increase). Accordingly, the first torsion spring 17 will start to rotate with respect to the stationary spring holder 16 (the latter being prevented from rotating by the housing 25). As the first torsion spring 17 rotates it will take along the slave spring holder 19 via the catch finger 50 which is caught between the tangs 37, 38. Since the second torsion spring 20 is clamped onto the slave spring holder 19 it will rotate along, taking along between its tangs 37, 38 the limit stop 55 and with that the second tilt ring 21.

Thus, with the tilt assembly according to the embodiment of the invention, the first tilt ring 22 will start to rotate first.

The second tilt ring 21 will follow with a certain delay. The duration of this delay is determined by the extent to which the prong 43 can freely rotate before hitting against one of the tangs 38, 37, causing the first spring 17 to open and start rotating, and with that the second tilt ring 21.

Meanwhile, when the first tilt ring 22 has been rotated over about 180° in counter clockwise direction, the second tang 38 of the third torsion spring 23 and the limit stop 55 of the first tilt ring 22 will come into abutment with the left hand side of the first stop formation 73. As the drive shaft 10 is rotated further it will cause the second tang 38 to be urged towards the first tang 37, thereby causing the third torsion spring 23 to open, thereby allowing the master spring holder 24 to rotate freely, while the third torsion spring 23 and first tilt ring 22 remain stationary in said second end position in which they are prevented from rotating further in anti clock wise direction. A similar effect occurs when the second tang 38 of the second torsion spring 20 and the limit stop 55 of the second tilt ring 21 abut the left hand side of the second stop formation 75. Upon further rotation of the drive shaft 10, the tang 38 is urged toward the first tang 37 causing the second torsion spring 20 to open, thereby releasing its grip on the slave spring holder 19 and allowing the spring catcher 18, first torsion spring 17 and slave spring holder 19 to rotate freely, while the second torsion spring 20 and the second tilt ring 21 remain stationary in their second end position.

At this point in time, the tilt action of the tilt assembly is completed and the drive shaft 10 can now be rotated counter clockwise as long as desired to unwind the lift cord (and lower the slats).

When a user subsequently rotates the drive shaft 10 in clock wise direction (as indicated by arrow R in FIG. 2A) the same sequence of motions occurs, but now in clockwise direction. That is, the master spring holder 24 will start to rotate in clockwise direction, thereby relieving the force on the tang 37 of the third torsion spring 23 allowing the spring 23 to close and start rotating with the master spring holder 24, taking along the first tilt ring 22.

Meanwhile, the spring catcher 18 will rotate along with the drive shaft 10 in clock wise direction, causing prong 43 to move away from the first tang 37 of the first spring 17, thereby allowing the spring to close and stop rotating, causing the slave spring holder 19 to stop rotating as well. The second tilt ring 21 remains stationary in its aforementioned second end position.

When the shaft 10 is rotated further in clockwise direction, the prong 43 of the spring catcher 18 will abut against the second tang 38 of the first torsion spring 17, causing the spring to open and rotate along with the spring catcher 18, thereby rotating the slave spring holder 19 along and with that, the second torsion spring 20 which will in turn rotate the second tilt ring 21 along.

Meanwhile, when the first tilt ring 22 has been rotated over about 180° in clock wise direction the first tang 37 of the third torsion spring 23 and the limit stop 55 of the first tilt ring 22 will come into abutment with the right hand side of the first stop formation 73. As the drive shaft 10 is rotated further it will cause the first tang 37 to be urged towards the first tang 37, causing the spring 23 to open, thereby allowing the master spring holder 24 to rotate freely, while the third torsion spring 23 and first tilt ring 22 remain stationary in the first end position in which they cannot rotate further in clock wise direction.

Similarly, when the first tang 37 of the second torsion spring 20 and the limit stop 55 of the second tilt ring 21 abut the right hand side of the second stop formation 75, the tang 37 will be urged toward the second tang 38 causing the second torsion spring 20 to open, thereby releasing the slave spring holder 19 and allow said slave spring holder 19 to continue to rotate freely, with the spring catcher 18 and the first torsion spring 17, while the second torsion spring 20 and the second tilt ring 21 remain stationary in their first end position.

At this point in time, the tilt action of the tilt assembly 15 is completed and the drive shaft 10 can be rotated clockwise as long as desired to wind up the lift cord 5 (thereby raising the slats 4).

The rotation sequence of the tilt rings 21, 22 can be used to tilt the slats 4 in several ways, depending on how the ladder cords 6A, 6B are coupled to said tilt rings 21, 22.
Double Pitch Operation For operating the blind in double pitch-mode the rear tilt cords 6AR, 6BR of the pair of ladder cords 6A, 6B need to be cross wise connected to the first and second tilt rings 22, 21, which means that the respective front tilt cords 6AF, 6BF are operatively connected to the first and second tilt ring 22, 21 while the respective rear tilt cords 6AR, 6BR are operatively connected to the second and first tilt ring 21, 22. In an alternative embodiment, the front tilt cords could be crosswise connected to the tilt rings.

Figure 12:
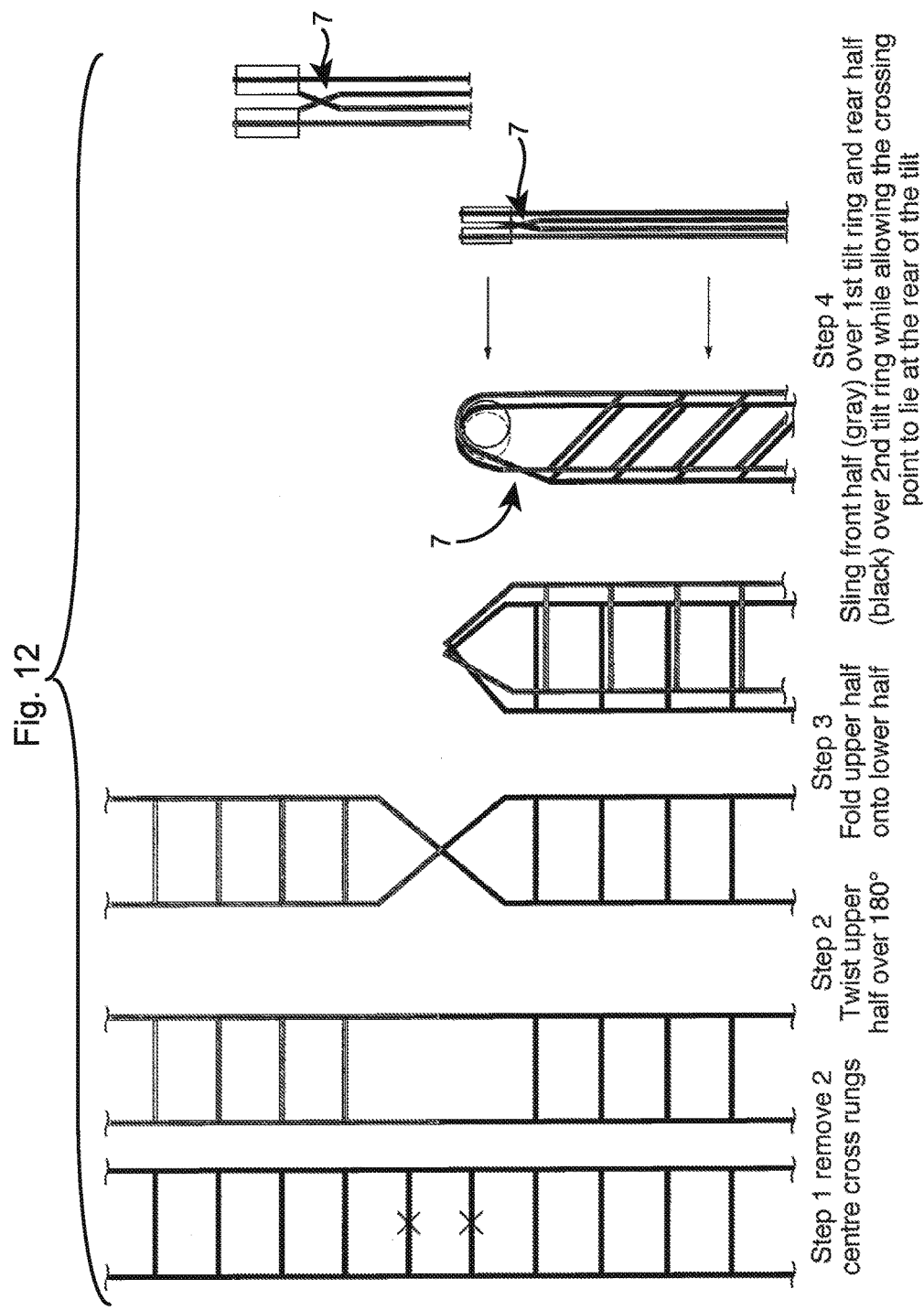
FIG. 12 shows the consecutive steps form modifying a standard ladder cord into a ladder cord that is suitable for double pitch operation of the blind.
Figure 13:
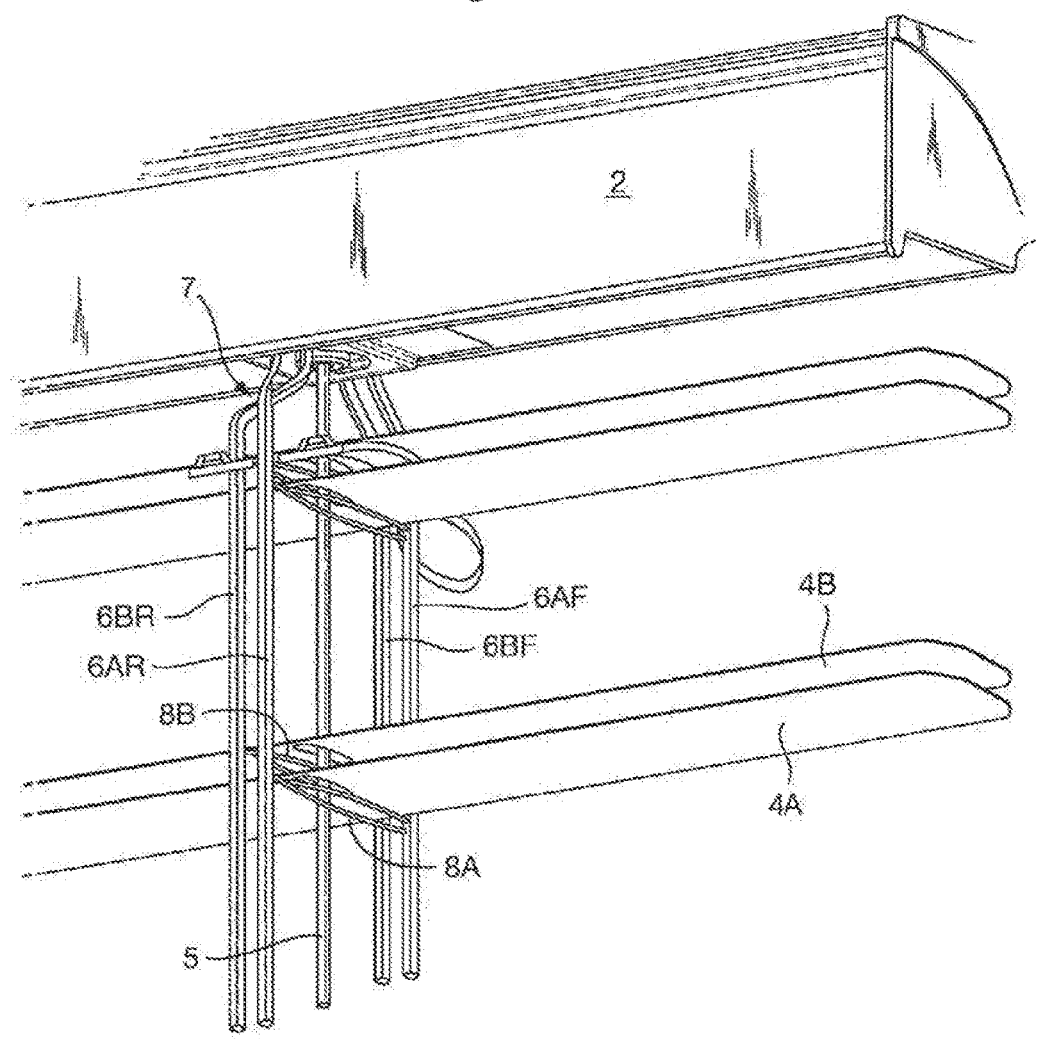
FIG. 13 shows a close up of the rear side of a Venetian blind, with the ladder cord of FIG. 12 in mounted condition.

According to a preferred embodiment, this can be simply realized by taking a double pitch ladder cord 6. First, the two cross rungs 8 extending halfway along the cord 6 are cut away (see FIG. 12). Next, the upper half of the cord (which in FIG. 12 has been given another grey shade, for clarity sake) is twisted around its longitudinal axis over 180°. Next, the upper half is folded on top of the bottom half. Next, the part 6A of the folded cord that corresponds to the upper half is slung around the second tilt ring 21 and the part 6B of the folded cord that corresponds to the lower half is slung around the first tilt ring 22, such that the crossing point 7 of the tilt cords lies somewhere at the rear side of the tilt rings 21, 22 as schematically shown in FIG. 12 and more truthfully depicted in FIG. 13.

Preferably, the cords 6A, 6B are secured to the first and second tilt ring 22, 21 in such a way that when the limit stops 55 of both tilt rings 21, 22 are located exactly halfway their first and second end positions, the cross rungs 8A,B extend substantially horizontally and the ladder cords 6A,B are shifted with respect to each other over half the pitch height, so that the cross rungs 8A of the first cord 6A extend halfway the cross rungs 8B of the second cord 6B, as seen in vertical direction. The cords 6A,B can be secured in this position by means of the cord clamp provisions 56, 59.

It is noted that the abovementioned situation would not occur during 'normal' operation of the drive shaft 10 because the rotation of the second tilt ring 21 always lags behind, as explained before. Thus, the limit stops 55 of the first and second tilt ring 22, 21 will only become aligned in their first and second end positions, not in some intermediate position. However, it is possible to manipulate the tilt assembly 15 in such way that the limit stops 55 will become aligned halfway their end positions. This will be explained later (see "standard Venetian blind operation").

The double pitch operation of the blind 1 will now be explained, starting from the fully retracted position, wherein the lift cords 5 will be wound onto the cord spools 12 and the first and second tilt rings 22, 21 will be in their first end position (with both limit stops 55 abutting the right hand side of the first and second stop formation 73, 75). In this first end position, the cross rungs 8A,B will be slanted downward from the rear to the front of the blind 1. However, since the bottom rail 3 is fully lifted, all slats 4 will be supported so as to extend substantially horizontally.

When the drive shaft 10 is rotated counter clockwise, the lift cords 5 will be lowered, causing the upper most slat 4B to be singled out from the stack. Being no longer supported by the bottom rail 3, the slat 4B will adopt the aforementioned downward slanted orientation of the upper most cross rung 8B.

During the first phase of operation, the first tilt ring 22 will rotate counter clockwise causing the front tilt cord 6BF of the second ladder cord 6B to be raised and the rear tilt cord 6AR of the first ladder cord 6A to be lowered, while the second tilt ring 21 and associated tilt cords (6AF, 6BR) remain stationary. As a result, the front side of the cross rungs 8B of the second ladder cord 6B will be lifted, while the rear side of the cross rungs 8A of the first ladder cord 6A will be lowered. Consequently, the orientation of the cross rungs 8A,B will change from a downward slanted orientation to a more horizontal orientation. The spacing between the cross rungs 8A,B will increase.

During a second phase of operation, the second tilt ring 21 will start rotating as well, causing the front tilt cord 6AF of the first ladder cord 6A to be raised and the rear tilt cord 6BR of the second ladder cord 6B to be lowered. This causes the cross rungs 8A,B to be tilted in the same manner as during the first phase, but at a double rate, due to the combined effect of the first and second tilt rings 22, 21. The spacing between the cross rungs 8A,B, will not change during this phase.

During a third phase of operation, the first tilt ring 22 will have reached its second end position, while the second tilt ring 21 is still rotating. Thus, the front tilt cord 6AF will be raised further, and the rear tilt cord 6BR will be lowered further while the other tilt cords remain stationary. This causes the rear side of the cross rungs 8B to be lowered, and the front side of the cross rungs 8A to be lifted. Accordingly, the cross rungs 8A,B are further tilted and the spacing between the cross rungs 8A,B decreases, thereby undoing the increase in spacing during the first phase.

Thus, at the end of the third phase, both tilt rings 21, 22 will have reached their second end position, the slats 4A,B are maximally tilted closed so as to slant downward from the front to the rear side of the blind 1 and the cross rungs 8A of the first ladder cords 6A will extend about halfway the cross rungs 8B of the second ladder cord 6B, as seen in vertical direction.

The blind 1 may now be lowered further, as far as desired, by continuing to rotate the drive shaft 10 in counter clock wise direction. No further tilting will take place. The slats 4A,B will be lowered in the aforementioned tilted closed orientation.

When the blind 1 has been lowered to a desired position, a user may reverse the rotation direction of the drive shaft 10 to open the slats of the blind 1. This will initiate a fourth phase of operation, in which the lift cord 5 starts to be wound on the cord spool 12, and the first tilt ring 22 will start rotating in clock wise direction. This will cause the front tilt cord 6BF of the second ladder cord 6B to be lowered and the rear tilt cord 6AR of the first ladder cord 6A to be lifted, while the other tilt cords (6AF, 6BR) remain stationary. As a result, the front side of the cross rungs 8B/slats 4B will be lowered and thus approach the stationary front side of the cross rungs 8A/slats 4A. Likewise, the rear side of the cross rungs 8A/slats 4A will be lifted, thereby approaching the stationary rear side of the cross rungs 8B/slats 4B. Thus, during this fourth phase, the slats 4A,B will be tilted open towards a more horizontal position, and at the same time, the slats 4A,B will approach each other in pairs.

Typically, the dimensioning of the tilt assembly 15 will be such that at the end of the fourth phase the slats 4A,B of each pair will have fully approached each other. However, the slats may not have been fully tilted open (horizontal) yet. In such case, a user may continue to rotate the drive shaft 10 in clockwise direction, thereby entering a fifth phase of operation in which the second tilt ring 21 starts to rotate as well. During this phase, both front tilt cords 6AF, 6BF will be lowered and both rear tilt cord 6AR, 6BR will be raised, causing the cross rungs 8A,B and slats 4A,B to be tilted open further, at double rate, without affecting the spacing between the cross rungs 8A,B and slats 4A,B.

During a sixth phase of operation, the user may continue to rotate the drive shaft 10. In this phase, the first tilt ring 22 will have reached its first end position will have stopped rotating. The second tilt ring 21 will still rotate, causing the slats 4A,B to move apart and tilt to a maximum closed position, wherein the slats are tilted downward from the rear to the front side. Upon further rotation of the drive shaft 10 no further tilting will take place, but the lift cords will be wound onto the cord spools 12 and the slats 4A,B will be raised.

It may be noted that the delay of the rotation of the second tilt ring 21 with respect to the first tilt ring 22 is determined by the free stroke over which prong 43 can rotate before hitting one of the tangs 37, 38, which will depend on the "width" of the prong 43 or, if two prongs 43 are provided, their location along the spring catcher 18, and on the location of the tangs. It is possible to delay rotation of the second tilt ring till the first tilt ring has already reached an end position. In such case, the first and second tilt ring will never rotate together as described in the second and fifth phase of operation. Obviously, this will also have an effect on the exact movement of the slats.

Standard Venetian Blind Operation

Instead of tilting the slats open in double-pitch mode, as described above, the slats can also be tilted open with a normal (single) pitch. This situation occurs when the limit stops 50 of the first and second tilt ring 22, 21 are aligned halfway the first and second end position.

To bring the tilt rings 21, 22 in such a position, the second phase of operation is changed. Instead of allowing the second tilt ring 21 to reach its second end position, counter clock rotation of the drive shaft 10 is stopped when the second tilt ring 21 reaches a position in which its limit stop 50 extends halfway the first and second end position.

Next, the drive shaft 10 is rotated clock wise. As a consequence, the prong 43 of the spring catcher 18 will no longer urge the first tang 37 of the first torsion spring 17 towards the second tang 38. As a result the first spring will close and stop rotating around the stationary spring holder 16. Accordingly, the slave spring holder 19 and the second torsion spring 20 will stop rotating as well and the second tilt ring 21 will remain stationary at the aforementioned position. However, the clockwise rotation of the drive shaft 10 will cause the first tilt ring 22, which is in its second end position, to start rotating. Rotation of the drive shaft 10 is stopped when the limit stop 50 of the first tilt ring 22 is aligned with the limit stop 50 of the second tilt ring 21. In this position, the slats 4A,B will extend substantially horizontally and at a normal pitch.

Duo-Control Operation

For the duo control operation, a first ladder cord 6A is provided for supporting the slats 4L in the lower part of the blind 1 and a second ladder cord 6B is provided that supports the slats 4U in the upper part of the blind.

Figure 14:
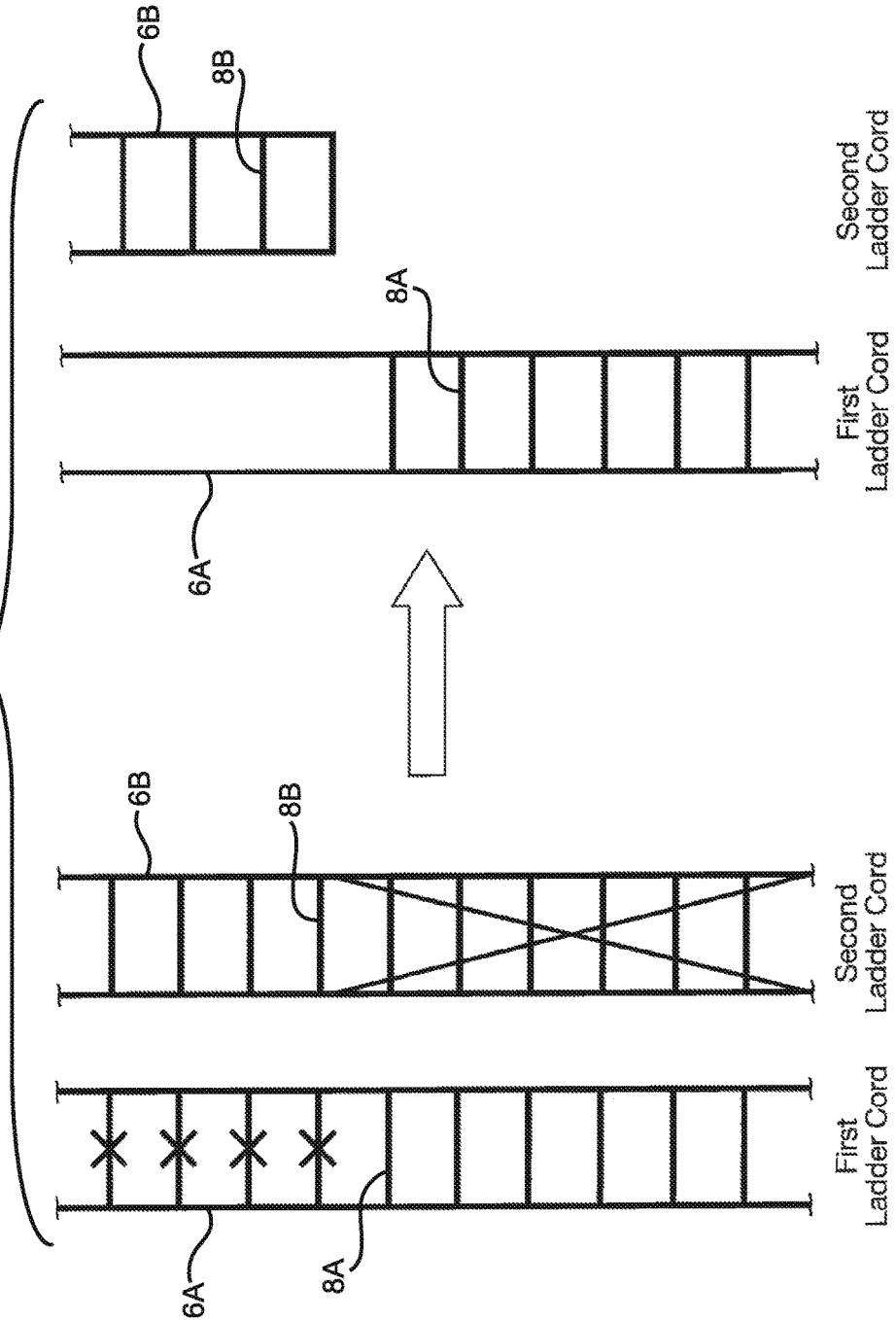
FIG. 14 shows the consecutive steps for modifying standard ladder cords into ladder cords that are suitable for duo-control operation of the blind.

The first ladder cord 6A can be prepared by taking a standard ladder cord and by cutting away the cross rungs 8A in the upper half of the cord so that the number of remaining cross rungs 8A in the lower half of the cord corresponds to the number of slats 4L in the lower half of the blind (see FIG. 14).

The second ladder cord 6B may be a standard ladder cord with a length and number of cross rungs 8B that correspond to the number of slats 4U in the upper half of the blind.

The first ladder cord 6A is mounted on and secured to the second tilt ring 21, and the second ladder cord 6B is mounted on and secured to the first tilt ring 22, such that the cross rungs 8A,B of the respective ladder cords extend substantially horizontally when the limit stops 50 of the first and second tilt ring 22, 21 extend halfway their first and second end position.

The duo-control operation of the blind 1 will be explained starting from the fully retracted position, wherein the first and second tilt rings 22, 21 are in the first end position. In this first end position, the cross rungs 8A,B will be slanted downward from the rear to the front of the blind 1, but because the bottom rail 3 is fully lifted, all slats 4 will be supported so as to extend substantially horizontally.

When the drive shaft 10 is rotated counter clockwise, the lift cord 5 will start to unwind from the cord spool 12 and the first tilt ring 22 will rotate counter clockwise from its first end position to its second end position. This rotation causes the cross rungs 8B/upper slats 4U to tilt from the above-mentioned initial orientation to a tilted closed orientation in which the slats 4U are slanted downward in the opposite direction, i.e. from the front to the rear.

Somewhere during the rotation of the first tilt ring 22, the second tilt ring 21 will start to rotate as well, causing the cross rungs 8A/lower slats 4L to tilt to the same closed position as the cross rungs 8B/upper slats 4U.

Further counter clockwise rotation of the drive shaft 10 will cause the lift cords 5 to unwind further, thereby lowering the upper slats 4U and subsequently the lower slats 4L.

When the blind 1 has been lowered to a desired position, the user may start to rotate the drive shaft 10 in clock wise direction. This will cause the lift cord 5 to be wound onto the cord spool 12, thereby raising the lowermost slats. At the same time, the first tilt ring 22 will start to rotate in clockwise direction, causing the cross rungs 8B/upper slats 4U to tilt open towards a horizontal position.

By continuing to rotate the drive shaft 10 in clock wise direction, the second tilt ring 21 will start to rotate as well, causing the lower slats 4L to tilt open towards a horizontal position. At the same time, the upper slats 4U will tilt further until the first tilt ring 22 reaches its first end position. In said position, the upper slats 4U will have been tilted closed, i.e. slanted downward from the rear to the front of the blind.

Further clockwise rotation of the drive shaft 10 will cause the second tilt ring 21 to reach its first end position as well, in which the lower slats 4L will have the same tilted closed orientation as the upper slats 4U.

Further clockwise rotation of the drive shaft will cause the slats to be retracted.

FIG. 16 shows another embodiment of a tilt assembly according to the invention. This tilt assembly 15' includes a first tilt element (first tilt ring 22) a second tilt element (second tilt ring 21), a main clutch mechanism (torsion spring 23) and a secondary clutch mechanism (torsion spring 20) that are substantially similar to the previous embodiment. The tilt assembly differs over the previous embodiment in that it includes a modified input connector and a modified secondary input mechanism.

The input connector includes a cord spool connector 27 and a master spring holder 24. The cord spool connector 27 is similar to the one described in relation to the previous embodiment. It comprises a cylindrical main body 80 that at one end is provided with a flange 81. The main body is provided with two slots 82 extending in axial direction at diametrically opposed positions. The flange 81 is at its other side provided with two click fingers 83.

The master spring holder 24' comprises a cylindrical main body 60 with a first portion 60A that is surrounded by two flanges 61, 62 and a second portion 60B that is provided with a master catch 64. This master catch 64 projects axially outward from a free edge of said second portion 60B along a portion of its circumference. The first half 60A is at its inner side provided with two ribs (not visible) extending in axial direction at diametrically opposed positions.

The secondary input mechanism includes a slave spring holder 19'. The slave spring holder 19' comprises a first cylindrical portion 45' that is surrounded by two radial flanges 48', 49' and a second cylindrical portion 46' that is of smaller diameter than the first portion 45'. The first cylindrical portion 45' is provided with a slave catch 50' that projects axially outward from the transition between the first and second cylindrical portion along a portion of the outer circumference of the second cylindrical portion 46'.

In assembled condition, torsion spring 23 is mounted on the master spring holder 24', between the flanges 61, 62 and torsion spring 20 is mounted on the slave spring holder 19' between the flanges 48', 49'. Furthermore, the first tilt ring 22 is mounted on the second portion 60B of the master spring holder 24' and the second tilt ring 21 is mounted on the first cylindrical portion 45' of the slave spring holder 19' that extends between flange 48' and the second cylindrical portion 46'. The first and second tilt ring 22, 21 are mounted such that their respective limit stops 55 extend between the tangs of torsion spring 23, respectively 20. Next, the second cylindrical portion 46' of the slave spring holder 19 'is inserted in the second portion 60B of the master spring holder 24'. This subassembly is mounted in the housing 25 such that both the master spring holder 24' and the slave spring holder 19' are supported in the housing 25 for rotation. Next the cord spool connector 27 is non-rotatably connected to the cord spool 12 via click fingers 83, and the master spring holder 24 is non-rotatably connected to the cord spool connector 27 via its ribs being received in the slots 82.

When the cord spool 12 is rotated by the drive shaft, the input connector 27 and master spring holder 24' will be rotated as well. The slave spring holder 19' may initially remain stationary until the master catch 64 engages the slave catch 50'. This will cause the slave spring holder 19' to be rotated by the master spring holder 24'. The torsion springs 23, 20 are clamped around the master and slave spring holder respectively, and therefore will rotate together therewith, dragging along the first and second tilt rings 22, 21 (via the limit stops 55 that are caught between the tangs 37, 38 of the springs 23, 20). As with the previous embodiment, when a limit stop 55 of the first or second tilt ring 22, 21 comes into abutment with a stop formation 73, 75, the associated torsion spring 23, 20 will be opened thereby releasing the tilt ring from the input connector/master spring holder 24' and/or from the secondary input mechanism/the slave spring holder 19'. As a consequence, the master spring holder 24 and slave spring holder 19' may continue to rotate while the tilt rings 22, 21 remain stationary in their end position.

If the rotation direction of the drive shaft is reversed, the master spring holder 24' will start rotating in the opposite direction thereby relieving the force on the tang 37 of the torsion spring 23. As a consequence, the spring 23 may close and start rotating with the master spring holder 24' dragging the first tilt ring 22 along. When the master catch 64 on the master spring holder 24' engages the slave catch 50' on the slave spring holder 19' the latter will start rotating in opposite direction as well, allowing the torsion spring 20 to close and drag along the second tilt ring 21

It will be appreciated that the geometry of the master catch 64 and the slave catch 50' determines the angle over which the master spring holder 24' can rotate before it engages the slave spring holder 19' and thus determines the delay between rotation of the first and second tilt rings 22, 21. Depending on the design of the catches 64, 50', in particular their angular extent in circumferential direction, the delay may range from virtually no delay (the catches 64 and 50' together span the entire circumference of the master and slave spring holder) to a maximum delay of almost one full revolution of the master spring holder 24' (each catch 64, 50' has an angular extent of a few degrees only).

FIGS. 17 and 18 show another embodiment of a tilt-lift assembly according to the invention, in exploded view and assembled condition respectively. The tilt-lift assembly comprises a cord spool 112 and a tilt assembly 115. The cord spool may be similar to the one shown in FIGS. 1, 3A and/or 15. The tilt assembly 115 includes a first tilt element, more particularly a first ring segment 122, and a second tilt element, more particularly a second ring segment 121 for supporting a pair of tilt ladders (not shown). The tilt assembly 115 further includes an input connector 127 configured to receive and rotate with a drive shaft (not shown) that in use also drives the cord spool 112. The tilt assembly 115 further includes a main clutch mechanism, in particular a main spool 123 for releasably connecting the first tilt element 122 to the input connecter 127, a secondary input mechanism 118, 117 configured to receive drive so as to rotate with the input connector 127; and a secondary clutch mechanism, in particularly a secondary spool 120 for releasably connecting the second tilt element 121 to the secondary input mechanism 118, 117.

The first and second ring segments 122, 121 can be brought into frictional engagement with an outer periphery of the main spool 123 and the secondary spool 120 respectively. The outer periphery of said spools 123, 120 may thereto be provided with a groove 136, preferably a tapered groove with slanting side walls 137, 138. The first and second ring segments 122, 121 may likewise be tapered, so as to form wedges with slanted side walls 153, 154. In assembled condition, these wedges or ring segments 122, 121 can be fitted at least partly in the respective grooves 136, with their sidewalls 153, 154 frictionally engaging the side walls 137, 138 of the grooves 136. Each respective side wall 153, 154 of the ring segments 122, 121 may be provided with dedicated frictional surfaces, which may be a single continuous surface or several discrete surfaces, e.g. provided towards the respective ends of the ring segments 122, 121.

The secondary input mechanism includes a first catch 118 on the main spool 123 facing the secondary spool 120, and a second catch 117 on the secondary spool 120 facing the main spool 123. The first and second catches 117, 118 are arranged such that the first catch 118 will engage the second catch 117 when the main spool 123 is rotated relative to the secondary spool 120. In engaged condition, the secondary spool 120 will rotate together with the main spool 123.

The tilt assembly 115 further includes first and second stop formations 173A,B, 175A,B provided adjacent the outer circumference of the main spool 123 and secondary spool 120 respectively, to limit rotation of the first and second ring segment 122, 121 respectively in clockwise and counterclockwise direction. In the illustrated embodiment these stop formations 173A,B, 175 A,B are integrally formed with the housing 125 of the tilt assembly 115. In an alternative embodiment, the stop formations 173A,B, 175A,B may be formed as separate parts that can be releasably connected to the housing 125, for instance through snap fit action. Advantageously, a selection of different stop formations 173A,B, 175A,B may be provided, with different sizes, in particular with different angular extents along the circumference of the spools 123, 120. In this way, the maximum tilt angle of the tilt assembly can be readily varied by interchanging the stop formations. Accordingly, the tilt assembly 115 can be readily adapted for use with different blinds, e.g. with slats of different widths requiring different maximum tilt angles.

In assembled condition, illustrated in FIG. 18, the main spool 123 is mounted onto the input connector 127 in a non rotatable way and the secondary spool 120 is mounted on the support body 130 in a rotatable way. The support body 130 is with one end connected to the support body holder 116 in a non-rotatable way and with its other end connected to the input connector 127 so as to support the input connector 127 in a rotatable way. This subassembly is mounted into the housing 125, with the support body holder 116 being stationary and the input connector 127 being supported for rotation. A pair of tilt ladders 6A, 6B is secured to the first and second ring segment 122, 121 in any suitable way according to one of the previously described configurations depending on the desired tilt configuration of the slats, i.e. double pitch operation, duo-control operation, etc. The first and second ring segment 122, 121 are subsequently fitted into the respective grooves 136 of the main and secondary spool 123, 120. Next, the cord spool 112 is connected to the input connector 127 in a non-rotatable way, a lift cord 5 is with one end secured to the cord spool 112, and the housing 125 may be closed with a cover 126.

The tilt assembly 115 operates as follows. When the drive shaft is rotated clockwise or counter clockwise, the cord spool 112, input connector 127 and main spool 123 will be rotated as well. Depending on the design of the first and second catches 118, 117 the secondary spool 120 may initially remain stationary, until the first catch 118 engages the second catch 117. This will cause the secondary spool 120 to start rotating together with the main spool 123. The first and second ring segment 122, 121 will be in frictional engagement with the respective spools 123, 120. This frictional engagement may be enhanced by the weight of the slats hanging from the tilt ladders 6A,6B. Accordingly, the first and second ring segment 122, 121 will rotate together with the respective spools 123, 120. When a ring segment 122, 121 abuts one of the associated stop formations 173A, B, 175A,B, further rotation of said ring segment will be prevented and further tilting of the associated slats will be halted. As rotation of the associated spool is continued, said ring segment may be slightly lifted from the groove 136 and start to slip with regard to the spool. By overcoming the frictional engagement force, the spool 123, 120 may be continued to be rotated while the ring segment remains in its end position. If the rotation direction of the drive shaft is reversed, the main spool 123 will start rotating in the opposite direction. The first ring segment 122 will no longer be lifted by the stop formation 173A,B and will be urged back into frictional engagement with the main spool 123 through gravity. Accordingly, the first ring segment 122 will start rotating together with the main spool. When the first catch 118 on the main spool 123 engages the second catch 117 on the secondary spool 120, the latter will start rotating in opposite direction as well, taking along the second ring segment 121 through frictional engagement.

It will be appreciated that the frictional engagement between the respective ring segments 122, 121 and spools 123, 120 functions as a clutch mechanism that allows continued rotation of said spools, the drive shaft and the cord spool 112 when the tilt elements (first and second ring segments 122, 121) have reached an end position and tilting of the slats is halted. As a consequence, it becomes possible to drive both tilt elements 122, 121 using the same drive as used for lifting and lowering the blind.

Since the functioning of this clutch mechanism is based on gravity and friction, this tilt assembly 115 may work best with relatively large, i.e. heavy blinds. Thanks to the absence of springs, this tilt assembly 115 may be very cost effective.

It will further be appreciated that the secondary input mechanism 117, 118 may include a delay mechanism. Depending on the geometry of the catches 117, 118, in particular their angular extent as seen in circumferential direction of the spools, the main spool 123 will rotate through a predetermined angle before the first catch 118 engages the second catch 117. This predetermined angle may have any value between virtually zero and approx. 355°. When the predetermined angle is virtually zero there will be no delay. When the predetermined angle is approx. 355° the delay will be maximum, i.e. almost a full revolution of the main spool 123.

According to an optional aspect of the invention, the stationary support body 130 may be provided with a conical outer surface as illustrated in FIG. 17. The secondary spool 120 can be press-fitted onto the large diameter end of the support body, thereby locking said spool 120 against unintentional rotation. Such unintentional rotation may for instance occur under influence of the weight of the slats or through frictional contact between the spools 123, 120. The first catch 118 on the main spool may be provided with chamfered edges. When the first catch 118 approaches the second catch 117, the chamfered edge will cause the secondary spool 120 to be displaced axially, away from the main spool, to a portion of the support body 130 of smaller diameter, where the secondary spool 120 can rotate freely. A spring 129 may be provided at the other side of the secondary spool 120, as illustrated in FIG. 17, to bias the secondary spool 120 towards the main spool 123 and ensure that the first catch 18 remains engaged with the second catch 17.

What is claimed is:

1. A method of controlling a tilt ladder with a drive shaft using a tilt assembly having a first tilt element and a second tilt element both rotatable about a drive axis, the method comprising:
   providing rotatable drive from the drive shaft to rotate an input connector and an input mechanism of the tilt assembly, both being rotatable about the drive axis;
   releasably engaging the first tilt element to the input connector and releasing engagement at each of two opposite rotational orientations of the first tilt element; and
   releasably engaging the second tilt element to the input mechanism and releasing engagement at each of two opposite rotational orientations of the second tilt element.

2. The method of claim 1, further comprising delaying rotation of the second tilt element until after the first tilt element has begun to rotate.

3. The method of claim 1, further comprising:
   attaching a first cord of a tilt ladder to the first tilt element; and
   attaching a second cord of the tilt ladder to the second tilt element.

4. The method of claim 1, wherein releasably engaging the second tilt element to the input mechanism comprises:
   engaging an input part of the input mechanism to the drive shaft;
   selectively engaging a transfer part of the input mechanism to the input part; and
   releasably engaging the second tilt element to the transfer part.

5. The method of claim 4, wherein selectively engaging the transfer part to the input part comprises rotating the input part relative to the transfer part during rotation of the first tilt element for a predetermined ranges.

6. The method of claim 5, wherein selectively engaging the transfer part to the input part further comprises rotating the transfer part via the input part after rotation of the first tilt element for the predetermined range.

7. The method of claim 6, wherein releasably engaging the second tilt element to the transfer part comprises:
   engaging the second tilt element to the transfer part with a torsion spring; and
   releasing engagement of the torsion spring with the transfer part at each of the two opposite rotational orientations of the second tilt element.

8. A method of operating a tilt assembly of a blind, the method comprising:
   rotating a first tilt element of the tilt assembly about a drive axis for operating a first tilt ladder section;
   delaying rotation of a second tilt element of the tilt assembly during an initial rotation of the first tilt element; and
   rotating the second tilt element after the initial rotation of the first tilt element for operating a second tilt ladder section;
   wherein, when the blind is lowered to an extended position, the first and second tilt ladder sections support a plurality of slats for tilting along a common vertical section of the blind.

9. The method of claim 8, further comprising:
   attaching a first cord of the first tilt ladder section to the first tilt element; and
   attaching a second cord of the second tilt ladder section to the second tilt element.

10. The method of claim 8, further comprising rotating a drive shaft to rotate the first tilt element and the second tilt element.

11. The method of claim 10, further comprising:
    releasably engaging the first tilt element to the drive shaft; and
    releasing engagement of the first tilt element to the drive shaft at each of two opposite rotational orientations of the first tilt element.

12. The method of claim 10, further comprising:
    releasably engaging the second tilt element to the drive shaft; and
    releasing engagement of the second tilt element to the drive shaft at each of two opposite rotational orientations of the second tilt element.

13. The method of claim 12, wherein releasably engaging the second tilt element to the drive shaft comprises:

engaging an input part to the drive shaft;
selectively engaging a transfer part to the input part; and
releasably engaging the second tilt element to the transfer part.

14. The method of claim 13, wherein selectively engaging the transfer part to the input part comprises rotating the input part relative to the transfer part to delay rotation of the second tilt element.

15. The method of claim 14, wherein selectively engaging the transfer part to the input part further comprises rotating the transfer part via the input part to rotate the second tilt element after the initial rotation of the first tilt element.

16. The method of claim 15, wherein releasably engaging the second tilt element to the transfer part comprises:
engaging the second tilt element to the transfer part with a torsion spring; and
releasing engagement of the torsion spring with the transfer part at each of the two opposite rotational orientations of the second tilt element.

17. A method of operating a tilt assembly of a blind, the method comprising:
rotating a first tilt element of the tilt assembly about a drive axis for operating a first tilt ladder section;
delaying rotation of a second tilt element of the tilt assembly during an initial rotation of the first tilt element; and
rotating the second tilt element after the initial rotation of the first tilt element for operating a second tilt ladder section, wherein rotating the second tilt element comprises:
releasably engaging the second tilt element to a drive shaft; and
releasing engagement of the second tilt element to the drive shaft at each of two opposite rotational orientations of the second tilt element.

18. The method of claim 17, wherein releasably engaging the second tilt element to the drive shaft comprises:
engaging an input part to the drive shaft;
selectively engaging a transfer part to the input part; and
releasably engaging the second tilt element to the transfer part.

19. The method of claim 18, wherein selectively engaging the transfer part to the input part comprises rotating the input part relative to the transfer part to delay rotation of the second tilt element.

20. The method of claim 19, wherein selectively engaging the transfer part to the input part further comprises rotating the transfer part via the input part to rotate the second tilt element after the initial rotation of the first tilt element.

21. The method of claim 20, wherein releasably engaging the second tilt element to the transfer part comprises:
engaging the second tilt element to the transfer part with a torsion spring; and
releasing engagement of the torsion spring with the transfer part at each of the two opposite rotational orientations of the second tilt element.

* * * * *